(12) United States Patent
Nowell et al.

(10) Patent No.: US 11,536,378 B2
(45) Date of Patent: Dec. 27, 2022

(54) SEALING HIGH PRESSURE FLOW DEVICES

(71) Applicant: Kerr Machine Co., Sulphur, OK (US)

(72) Inventors: Mark S. Nowell, Ardmore, OK (US); Kelcy Jake Foster, Ardmore, OK (US); Michael Eugene May, Ardmore, OK (US); Brandon Scott Ayres, Ardmore, OK (US); Christopher Todd Barnett, Stratford, OK (US); Micheal Cole Thomas, Ardmore, OK (US); Guy J. Lapointe, Sulphur, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 17/738,189

(22) Filed: May 6, 2022

(65) Prior Publication Data

US 2022/0260161 A1    Aug. 18, 2022

Related U.S. Application Data

(60) Continuation-in-part of application No. 17/120,121, filed on Dec. 12, 2020, which is a continuation-in-part of application No. 16/814,267, filed on Mar. 10, 2020, now Pat. No. 10,907,738, which is a continuation of application No.
(Continued)

(51) Int. Cl.
| | |
|---|---|
| *F16K 5/18* | (2006.01) |
| *F15B 7/06* | (2006.01) |
| *F16K 5/04* | (2006.01) |
| *F16J 15/06* | (2006.01) |
| *F15B 21/00* | (2006.01) |
| *F04B 53/16* | (2006.01) |
| *F16K 5/16* | (2006.01) |

(Continued)

(52) U.S. Cl.
CPC ............ *F16K 5/184* (2013.01); *F04B 53/164* (2013.01); *F04B 53/22* (2013.01); *F15B 7/06* (2013.01); *F15B 21/00* (2013.01); *F16J 15/062* (2013.01); *F16K 5/0271* (2013.01); *F16K 5/0464* (2013.01); *F16K 5/0471* (2013.01); *F16K 5/0485* (2013.01); *F16K 5/0492* (2013.01); *F16K 5/161* (2013.01); *F16K 5/181* (2013.01)

(58) Field of Classification Search
CPC ...... F16K 5/184; F16K 5/0271; F16K 5/0464; F16K 5/0471; F16K 5/0485; F16K 5/0492; F16K 5/161; F16K 5/181; F04B 53/164; F04B 53/22; F15B 7/06; F15B 21/00; F16J 15/062
USPC ........................... 251/214; 417/454; 137/884
See application file for complete search history.

(56) References Cited

U.S. PATENT DOCUMENTS

| | | |
|---|---|---|
| X589725 | 9/1897 | Hodge et al. |
| 1,316,539 A | 6/1919 | Ford |
| | (Continued) | |

OTHER PUBLICATIONS

U.S. Patent and Trademark Office File History for U.S. Pat. No. 10,591,070, 168 pages, Alexandria, VA—See USPTO Records.
(Continued)

*Primary Examiner* — John Bastianelli
(74) *Attorney, Agent, or Firm* — Tomlinson McKinstry, P.C.

(57) ABSTRACT

A fluid end assembly comprising a housing having multiple conduits formed therein. A tubular sleeve is installed within one of the conduits and is configured to house a plurality of packing seals. A seal is installed within a groove formed in the walls of the housing surrounding the tubular sleeve such that the seal engages an outer surface of the tubular sleeve.

9 Claims, 17 Drawing Sheets

Related U.S. Application Data

16/574,918, filed on Sep. 18, 2019, now Pat. No. 10,591,070, which is a division of application No. 15/719,124, filed on Sep. 28, 2017, now Pat. No. 10,895,325, which is a continuation-in-part of application No. 15/280,642, filed on Sep. 29, 2016, now Pat. No. 10,288,178.

(60) Provisional application No. 63/185,646, filed on May 7, 2021, provisional application No. 62/959,260, filed on Jan. 10, 2020, provisional application No. 62/947,369, filed on Dec. 12, 2019, provisional application No. 62/346,915, filed on Jun. 7, 2016, provisional application No. 62/318,542, filed on Apr. 5, 2016, provisional application No. 62/315,343, filed on Mar. 30, 2016, provisional application No. 62/234,483, filed on Sep. 29, 2015.

(51) Int. Cl.
*F16K 5/02* (2006.01)
*F04B 53/22* (2006.01)

(56) References Cited

U.S. PATENT DOCUMENTS

| | | |
|---|---|---|
| 1,822,682 A | 9/1931 | Weiger |
| 1,867,279 A | 7/1932 | Price |
| 1,995,395 A | 3/1935 | Mohr |
| 2,713,522 A | 7/1955 | Petch |
| 2,756,960 A | 7/1956 | Church |
| 2,856,857 A | 10/1958 | Saalfrank |
| 3,053,500 A | 9/1962 | Atknison |
| 3,146,724 A | 9/1964 | Cornelsen |
| 3,152,787 A | 10/1964 | Timmons |
| 3,173,648 A | 3/1965 | McGuire et al. |
| 3,179,121 A | 4/1965 | Bredtschneider et al. |
| 3,219,311 A | 11/1965 | Siver |
| 3,244,424 A | 4/1966 | Cope |
| 3,257,095 A | 6/1966 | Siver |
| 3,257,952 A | 6/1966 | McCormick |
| 3,269,698 A | 8/1966 | Koch |
| 3,373,695 A | 3/1968 | Yohpe |
| 3,427,988 A | 2/1969 | Redman et al. |
| 3,474,808 A | 10/1969 | Elliott |
| 3,504,888 A | 4/1970 | Bates, Jr. et al. |
| 3,589,387 A | 6/1971 | Raymond |
| 3,679,332 A | 7/1972 | Yohpe |
| 3,698,726 A | 10/1972 | Schettler |
| 3,702,624 A | 11/1972 | Fries |
| 3,831,900 A | 8/1974 | Matousek et al. |
| 4,047,850 A | 9/1977 | Berthelot |
| 4,077,102 A | 3/1978 | Smith |
| 4,170,214 A | 10/1979 | Gill et al. |
| 4,363,463 A | 12/1982 | Moon, Jr. |
| 4,388,050 A | 6/1983 | Schuller |
| 4,467,703 A | 8/1984 | Redwine et al. |
| 4,470,771 A | 9/1984 | Hall et al. |
| 4,520,837 A | 6/1985 | Cole et al. |
| 4,768,933 A | 9/1988 | Stachowiak |
| 4,771,801 A | 9/1988 | Crump et al. |
| 4,773,833 A | 9/1988 | Wilkinson et al. |
| 4,778,347 A | 10/1988 | Mize |
| 4,861,241 A | 8/1989 | Gamboa et al. |
| 4,878,815 A | 11/1989 | Stachowiak |
| 4,948,349 A | 8/1990 | Koiwa |
| 4,984,970 A | 1/1991 | Eickmann |
| 5,059,101 A | 10/1991 | Valavaara |
| 5,073,096 A | 12/1991 | King et al. |
| 5,145,340 A | 9/1992 | Allard |
| 5,207,242 A | 5/1993 | Daghe et al. |
| 5,226,445 A | 7/1993 | Surjaatmadja |
| 5,362,215 A | 11/1994 | King |
| 5,370,148 A | 12/1994 | Shafer |
| 5,507,219 A | 4/1996 | Stogner |
| 5,524,902 A | 6/1996 | Cornette |
| 5,626,345 A | 5/1997 | Wallace |
| D383,053 S | 9/1997 | Schrader et al. |
| 5,685,519 A | 11/1997 | Bircann et al. |
| 6,000,764 A | 12/1999 | Dokas |
| 6,164,318 A | 12/2000 | Dixon |
| 6,167,959 B1 | 1/2001 | Bassinger et al. |
| 6,257,626 B1 | 10/2001 | Campau et al. |
| 6,382,940 B1 | 5/2002 | Blume |
| 6,419,459 B1 | 7/2002 | Sibbing |
| 6,544,012 B1 | 4/2003 | Blume |
| 6,641,112 B2 | 11/2003 | Antoff et al. |
| 6,910,871 B1 | 6/2005 | Blume |
| 7,140,211 B2 | 11/2006 | Tremblay |
| 7,168,440 B1 | 1/2007 | Blume |
| 7,186,097 B1 | 3/2007 | Blume |
| 7,290,560 B2 | 11/2007 | Orr et al. |
| 7,296,591 B2 | 11/2007 | Moe et al. |
| 7,335,002 B2 | 6/2008 | Vicars |
| 7,506,574 B2 | 3/2009 | Jensen et al. |
| 7,513,759 B1 | 4/2009 | Blume |
| D616,966 S | 6/2010 | Angell |
| 7,789,133 B2 | 9/2010 | McGuire |
| 7,828,053 B2 | 11/2010 | McGuire et al. |
| 7,845,413 B2 | 12/2010 | Shampine et al. |
| D631,142 S | 1/2011 | Angell |
| 7,866,346 B1 | 1/2011 | Walters |
| 7,891,374 B2 | 2/2011 | Vicars |
| 7,963,502 B2 | 6/2011 | Lovell et al. |
| 8,100,407 B2 | 1/2012 | Stanton et al. |
| 8,317,498 B2 | 11/2012 | Gambier et al. |
| 8,360,094 B2 | 1/2013 | Steinbock et al. |
| 8,365,754 B2 | 2/2013 | Riley et al. |
| 8,528,462 B2 | 9/2013 | Pacht |
| 8,528,585 B2 | 9/2013 | McGuire |
| 8,701,546 B2 | 4/2014 | Pacht |
| D731,035 S | 2/2015 | Lo Cicero |
| 9,010,412 B2 | 4/2015 | McGuire |
| D737,497 S | 8/2015 | Burgess et al. |
| 9,188,121 B1 | 11/2015 | Dille |
| D748,228 S | 1/2016 | Bayyouk et al. |
| 9,260,933 B2 | 2/2016 | Artherholt et al. |
| 9,328,745 B2 | 5/2016 | Bartlok et al. |
| 9,371,919 B2 | 6/2016 | Forrest et al. |
| 9,416,887 B2 | 8/2016 | Blume |
| 9,435,454 B2 | 9/2016 | Blume |
| 9,534,473 B2 | 1/2017 | Morris et al. |
| 9,631,739 B2 | 4/2017 | Belshan et al. |
| D787,029 S | 5/2017 | Bayyouk et al. |
| 9,732,746 B2 | 8/2017 | Chandrasekaran et al. |
| 9,822,894 B2 | 11/2017 | Bayyouk et al. |
| D806,241 S | 12/2017 | Swinney et al. |
| 10,184,470 B2 | 1/2019 | Barnett, Jr. |
| 10,221,847 B2 | 3/2019 | Dyer |
| 10,519,950 B2 | 12/2019 | Foster |
| 10,914,171 B2 | 2/2021 | Foster |
| 2002/0166588 A1 | 11/2002 | Dean |
| 2004/0170507 A1 | 9/2004 | Vicars |
| 2004/0234404 A1 | 11/2004 | Vicars |
| 2005/0151107 A1 | 7/2005 | Shu |
| 2005/0200081 A1 | 9/2005 | Stanton et al. |
| 2006/0002806 A1 | 1/2006 | Baxter et al. |
| 2006/0027779 A1 | 2/2006 | McGuire et al. |
| 2008/0006089 A1 | 1/2008 | Adnan et al. |
| 2008/0008605 A1 | 1/2008 | Bauer et al. |
| 2008/0093361 A1 | 4/2008 | Kennedy et al. |
| 2008/0279706 A1 | 11/2008 | Gambier et al. |
| 2010/0243255 A1 | 9/2010 | Luharuka et al. |
| 2011/0079302 A1 | 4/2011 | Hawes |
| 2011/0173814 A1 | 7/2011 | Patel |
| 2011/0189040 A1 | 8/2011 | Vicars |
| 2011/0206547 A1 | 8/2011 | Kim et al. |
| 2011/0236238 A1 | 9/2011 | Cordes et al. |
| 2012/0063936 A1 | 3/2012 | Baxter et al. |
| 2012/0141308 A1 | 6/2012 | Saini et al. |
| 2012/0187321 A1 | 7/2012 | Small |
| 2013/0020521 A1 | 1/2013 | Byrne |
| 2013/0112074 A1 | 5/2013 | Small |

(56) References Cited

U.S. PATENT DOCUMENTS

| | | |
|---|---|---|
| 2013/0202458 A1 | 8/2013 | Byrne et al. |
| 2013/0319220 A1 | 12/2013 | Luharuka et al. |
| 2014/0127062 A1 | 5/2014 | Buckley et al. |
| 2014/0196883 A1 | 7/2014 | Artherholt et al. |
| 2014/0348677 A1 | 11/2014 | Moeller et al. |
| 2015/0084335 A1 | 3/2015 | Farrell et al. |
| 2015/0132157 A1 | 5/2015 | Whaley et al. |
| 2015/0144826 A1 | 5/2015 | Bayyouk et al. |
| 2016/0123313 A1 | 5/2016 | Simmons |
| 2016/0160848 A1 | 6/2016 | Toppings et al. |
| 2017/0089473 A1 | 3/2017 | Nowell et al. |
| 2017/0002947 A1 | 5/2017 | Bayyouk et al. |
| 2017/0204852 A1 | 7/2017 | Barnett, Jr. |
| 2017/0211565 A1 | 7/2017 | Morreale |
| 2018/0017173 A1 | 1/2018 | Nowell et al. |
| 2018/0313456 A1 | 11/2018 | Bayyouk et al. |
| 2019/0011051 A1 | 1/2019 | Yeung |
| 2019/0128104 A1 | 5/2019 | Graham |

OTHER PUBLICATIONS

Exhibit B—Gradner Denver, Well Servicing Pump, Model GD-3000 Operating and Service Manual, dated Apr. 2011, (GD-3000), 44 pages.
Exhibit C—National Oilwell Varco 267Q-6M Quintuplex Plunger Pump Parts List, issued Sep. 6, 2000 and revised Jul. 21, 2008 (NOV-267Q), 13 pages.
Exhibit D (Part 1)—Declaration of William D. Marscher, PE, 209 pages.
Exhibit D (Part 2)—Declaration of William D. Marscher, PE, 124 pages.
Exhibit E—U.S. Patent and Trademark Office File History for U.S. Appl. No. 62/234,483, 45 pages, Alexandria, VA.
Exhibit F—U.S. Patent and Trademark Office File History for U.S. Appl. No. 62/315,343, 41 pages, Alexandria, VA.
Exhibit G—U.S. Patent and Trademark Office File History for U.S. Appl. No. 62/318,542, 44 pages, Alexandria, VA.
Exhibit H—U.S. Patent and Trademark Office File History for U.S. Appl. No. 62/346,915, 41 pages, Alexandria, VA.
U.S. Patent and Trademark Office File History for U.S. Pat. No. 10,591,070, 353 pages, Alexandria, VA—See USPTO Records.
U.S. Patent and Trademark Office File History for U.S. Appl. No. 15/719,124, 183 pages, Alexandria, VA—See USPTO Records.
Exhibit K—Susan Woods, Groove Milling, Cutting Tool Engineering, published Aug. 1, 2012, 11 pages.
Exhibit L—"Weir SPM General Catalog" (2009), 40 pages.
Exhibit M—Groovex, "Groove Milling, High Precision Tools for Groove Milling" brochure, Edition 04, dated Dec. 2012, 24 pages.
Exhibit N—Ricky Smith & R. Keith Mobley, Rules of Thumb for Maintenance and Reliability Engineers, 239-250 (2008), 15 pages.
Exhibit O—Ross Mackay, "Process engineering: Properly seal that pump", Chemical Processing, dated May 17, 2005, 11 pages.
Exhibit P—Vargus Ltd., "Groovex Groove milling", YOUTUBE (Dec. 12, 2011, https://www.youtube.com/watch?v=vrFzHJUXjvk, 68 pages.
Exhibit Q—Paresh Girdhar, Octo Moniz, & Steve Mackay, Centrifugal Pump Design, "Plant and Process Engineering 360°", 521-536 (2004), 21 pages.
Exhibit R—Paresh Girdhar, Octo Moniz, & Steve Mackay, Centrifugal Pump Design and Construction, Practical "Centrifugal Pumps: Design, Operation and Maintenance", 18-47 (2005), 33 pages.
Exhibit S—Gardner Denver, "Well Servicing Pump", Model HD-2250 Operating and Service Manual, dated Jan. 2005, 44 pages.
Exhibit T—Robert Crosier, "Flush Free Sealing Benefits", Empowering Pumps & Equipment, dated Oct. 3, 2011, 5 pages.
Exhibit U—Cat "Quintuplex Well Stimulation Pump", WS255 (2013), 2 pages.
Exhibit V—Oxford "Dictionary of Mechanical Engineering", excerpted (2013), 10 pages.
Exhibit W—United States Patent and Trademark Office, Before the Patent Trial and Appeal Board, "*Cizion, LLC d/b/a Vulcan Industrial Manufacturing*, Petitioner v. *Kerr Maching Co*., Patent Owner" Case PGR2020-00065 U.S. Pat. No. 10,591,070, Petition for Post-Grant Review of U.S. Pat. No. 10,591,070 Under 35 U.S.C. Section 321-329 and 37 C.F.R. Section 42.200 ET SEQ.—197 pages.
International Search Authority "PCT International Search Report", dated Mar. 31, 2020, 3 pages, Korean Intellectual Property Office, Republic of Korea.
Fluid end assemblies like those disclosed in Figure 3 of the current application and Figure 11 of the parent application, U.S. Patent Publication No. 2017/0089473, were offered for sale in the United States more than 1 year prior to Sep. 28, 2017.
Exhibit AB includes cross-sectional views of fluid end assemblies known in the art prior to Sep. 29, 2015, 4 pages.
Exhibit AC includes side views of valve seats known in the art prior to Sep. 29, 2015, 2 pages.
Exhibit AD is a cross-sectional view of a plunger end of a fluid assembly known in the art prior to Sep. 29, 2015, 1 page.
Exhibit AE includes an engineering drawing and pictures of a mud pump known in the art prior to Sep. 29, 2015, 4 pages.
Exhibits AF-AI include photos of a power end and fluid end known in the art prior to Dec. 11, 2017, 4 pages.
Exhibit AJ includes an engineering drawing of a mud pump known in the art prior to Jul. 14, 2017.
Wikipedia, Washer (hardware), 2017, first page; 10 pages.
Exhibit AK is a photograph of a fluid end offered for sale in the United States more than one year prior to Jun. 10, 2019, and also includes patent drawing of a fluid end similar to that shown in the photograph. The drawing was included in U.S. Appl. No. 62/532,574, filed Jul. 14, 2017, 2 pages.

SEALING HIGH PRESSURE FLOW DEVICES

BACKGROUND

This technology relates generally to sealing fluid flow passages inside flow control devices, such as those particularly suited for use in high pressure oil and gas production and processing systems.

For example, a fluid end is used in many well servicing applications to contain high pressure, often corrosive and/or abrasive, fracturing fluids in the oil and gas industry. A fluid end typically has a manifold body and a number of components mounted and sealed to the body, such as the suction and discharge plugs, suction and discharge valve seats, stuffing box, discharge flange, and suction manifold; with those components either alone or sleeved as are illustratively described herein. Like the valves, operating a fluid end in the harsh oilfield conditions can cause erosion of the body resulting in leakage in a short amount of time. Repairing the body is also cumbersome and disruptive in the oilfield.

Improvements are needed in the internal sealing of high pressure flow devices to increase operating life while reducing downtime and operating cost. What is needed is a solution that transfers the erosion (corrosion and abrasion) from the high pressure fluid end body to the component sealed with the body. It is to those improvements that embodiments of this technology are directed as described in the illustrative embodiments and contemplated within the scope of the claims.

DETAILED DESCRIPTION

Initially, this disclosure is by way of example only, not by limitation. The illustrative constructions and associated methods disclosed herein are not limited to use or application for sealing any specific assembly or in any specific environment. That is, the disclosed technology is not limited to use in sealing fluid ends as described in the illustrative embodiments. Thus, although the instrumentalities described herein are for the convenience of explanation, shown and described with respect to exemplary embodiments, the skilled artisan understands that the principles herein may be applied equally in sealing other types of high pressure flow devices.

Figure 1:
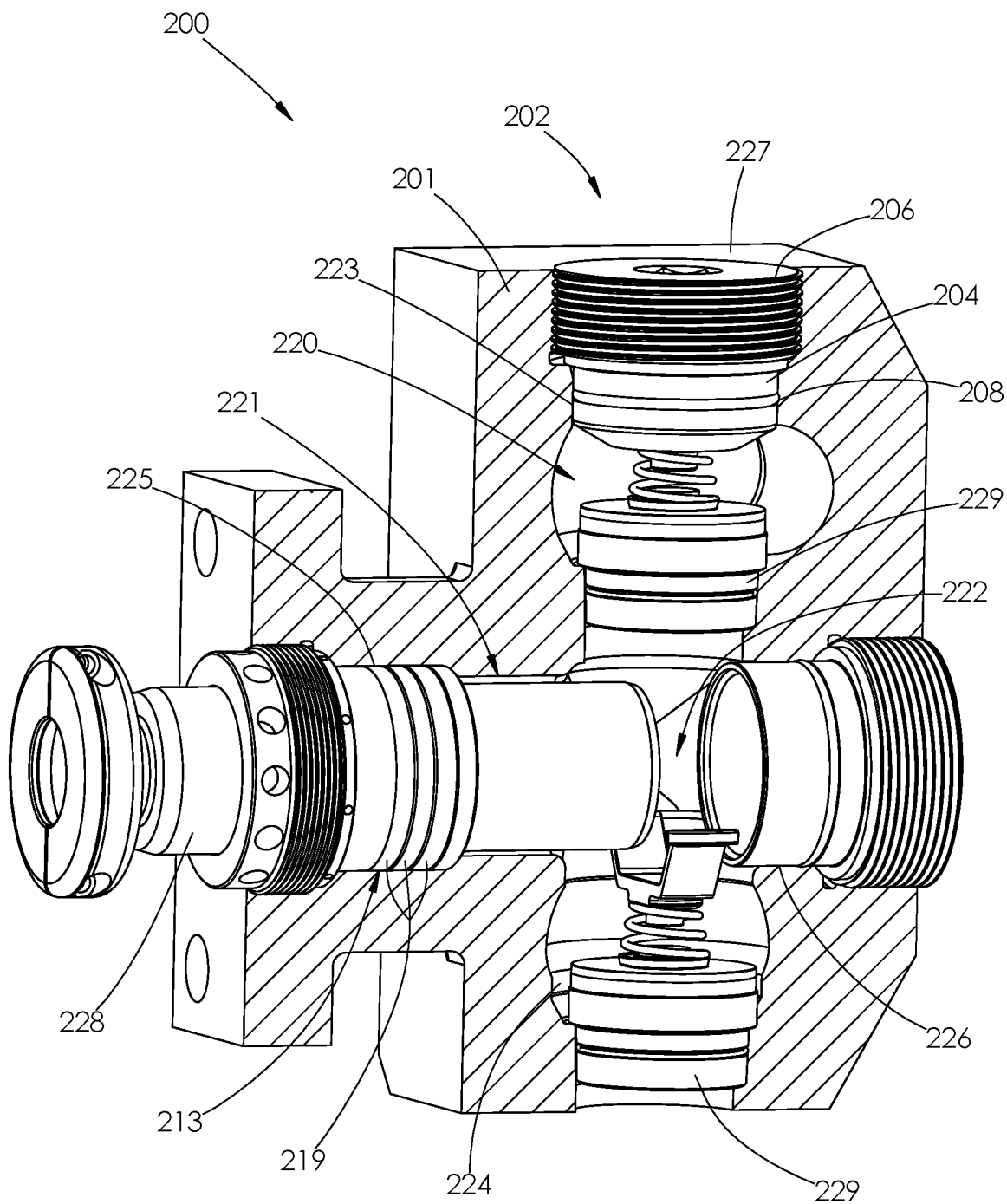
FIG. 1 is an isometric depiction of a fluid end known in the art.

FIG. 1 is a simplified isometric cross-sectional depiction of a hydraulic fracturing fluid end 200 that is constructed in accordance with previously attempted solutions. The fluid end 200 comprises a housing or fluid end body 201, which is generally a manifold used to deliver highly-pressurized corrosive and/or abrasive fluids, typically used in hydraulic fracturing processes in the oil and gas industry. Fluid may pass through the fluid end 200 at pressures that range from 5,000-15,000 pounds per square inch (psi). Fluid ends 200 used in high pressure hydraulic fracturing operations typically move fluid at a minimum of 8,000 psi. However, normally, the fluid end 200 will move fluid at pressures around 10,000-15,000 psi.

The fluid end body 201 typically has a first conduit 220 and a second conduit 221 formed within the body 201 that intersect to form an internal chamber 222. The first conduit 220 is typically orthogonal to the second conduit 221. The first conduit 220 may have aligned first and second sections 223 and 224 that are situated on opposite sides of the internal chamber 222. The first section 223 may be referred to as a discharge bore, and the second section 224 may be referred to as an intake bore. Likewise, the second conduit 221 may have aligned third and fourth sections 225 and 226 that are situated on opposite sides of the internal chamber 222. The third section 225 may be referred to as a plunger bore, and the fourth section 226 may be referred to as a suction bore. The sections 223, 224, 225, and 226 each may independently interconnect the internal chamber 222 to an external surface 227 of the fluid end 200.

A plunger 228 reciprocates within the fluid end body 201 to increase the pressure of fluid being discharged from the fluid end 200. As shown in FIG. 1, the plunger 228 may be disposed within the third section 225 of the second conduit 221. The plunger 228 is disposed within a plunger packing 213. The plunger packing 213 comprises a plurality of packing seals 219. The plunger 228 is powered by an engine operatively engaged with the fluid end 200. In high pressure hydraulic fracturing operations, the engine preferably has a power output of at least 2,250 horsepower. Valve seats 229 are also shown supported within the first conduit 220. The valve seats 229 may support valves, such as a ball valve, used to control the movement of high pressure fluid within the body 201.

There are sealing areas in the fluid end 200 that experience erosion during operation. For example, a number of components seal to the fluid end body 201. As discussed above, the sacrificial member for erosion is the fluid end body 201 instead of the less complex and less expensive mating component.

Figure 2:
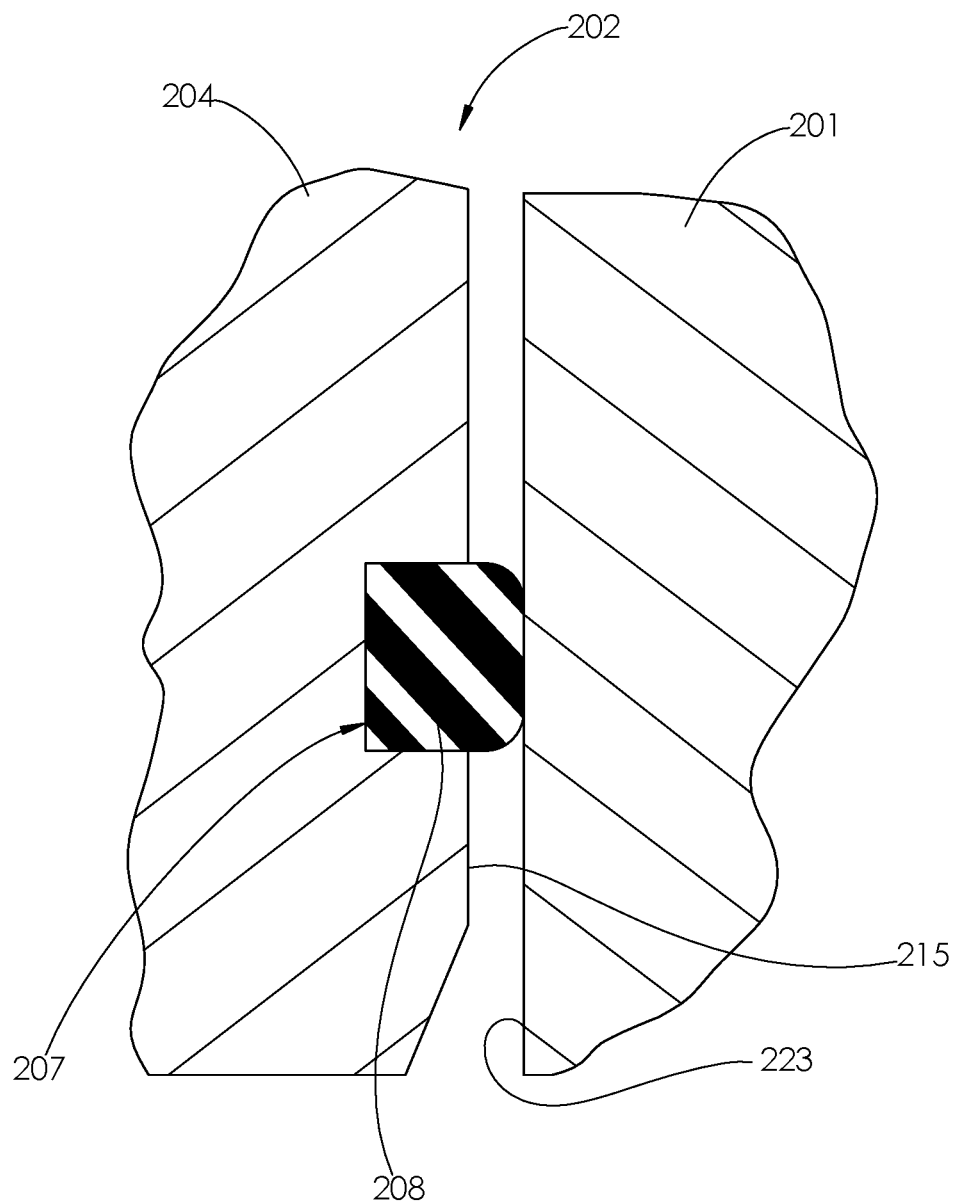
FIG. 2 is an enlarged depiction of a portion of the fluid end of FIG. 1.

For example, the fluid end body 201 defines a discharge opening 202 that opens into the discharge bore 223. The discharge opening 202 depicted in these embodiments is sealed closed by inserting a closure or discharge plug or cover 204 into the discharge bore 223 and securing it by advancing a threaded retaining nut 206 into the body 201. The retaining nut 206 may also be referred to as a retainer. The discharge plug 204 supports a seal 208 that seals against the walls of the fluid end body 201 defining the discharge bore 223. FIG. 2 is a simplified cross-sectional depiction of the discharge plug 204 that has a groove 207 into which the seal 208 is mounted.

In these illustrative embodiments the groove 207 is rectangular but the contemplated embodiments are not so limited. The skilled artisan understands that the configuration of the groove 207 is largely determined by what shape is required to mount the type of seal selected. The groove 207 intersects an outer surface 215 of the discharge plug 204, permitting the seal 208 to be sized so that a portion not mounted within the groove 207 extends beyond the outer surface 215 to pressingly engage against the walls of the fluid end body 201 defining the discharge bore 223. In this construction the highly-pressurized corrosive and/or abrasive fluid can be injected between the seal 208 and walls defining the discharge bore 223, causing erosion of the seal surface formed by the walls defining the discharge bore 223.

Fluid end bodies have conventionally been made of heat-treated carbon steel, so it was not uncommon for the fluid end body 201 to crack before any sacrificial erosion of the body progressed to the point of creating leakage between the discharge plug 204 and the discharge bore 223. However, progress in the technology has introduced stainless steel body construction resulting in a significantly longer operating life. As a result, this erosion is no longer negligible but is instead a consideration for reducing erosion in modern fluid end construction. One leading source of discharge bore 223 erosion in conventional fluid ends is the seal 208 mounted in the discharge plug 204 and extending therefrom to seal against a sealing surface formed by the fluid end body 201. The technology disclosed herein is configured to transfer that erosion wear from the fluid end body 201 to the less complex and less expensive discharge plug 204.

Figure 3:
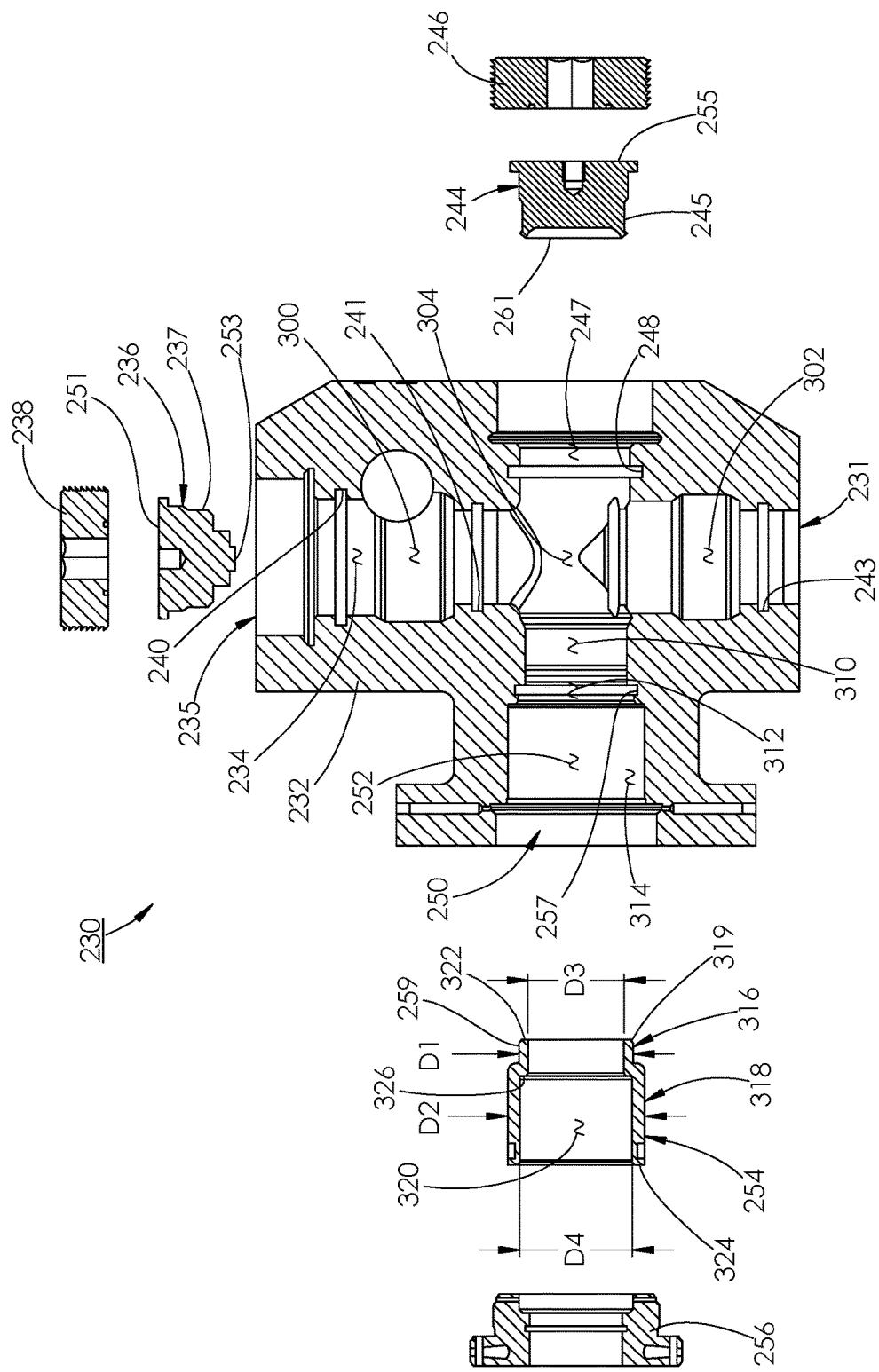
FIG. 3 is an exploded cross-sectional depiction of an embodiment of a fluid end.

FIG. 3 is an exploded cross-sectional depiction of a fluid end 230 having a housing or fluid end body 232. The fluid end 230 is constructed in accordance with the technology disclosed herein to, in numerous places, transfer the erosion wear from the body to the less complex and less expensive component that is sealed to the body. The fluid end body 232 forms a number of interconnected bores or conduits, including a first conduit 300. The first conduit 300 comprises a discharge bore 234 and an intake bore 302 positioned on opposite sides of an internal chamber 304. The discharge bore 234 defines a discharge opening 235 that is similar to the discharge opening 202 in the conventional fluid end 200 depicted in FIG. 1. Likewise, the intake bore 302 defines an intake opening 231 formed opposite the discharge opening 235. The first conduit 300 forms multi-dimensional diameters at different longitudinal locations between the discharge opening 235 and the intake opening 231.

Figure 9:
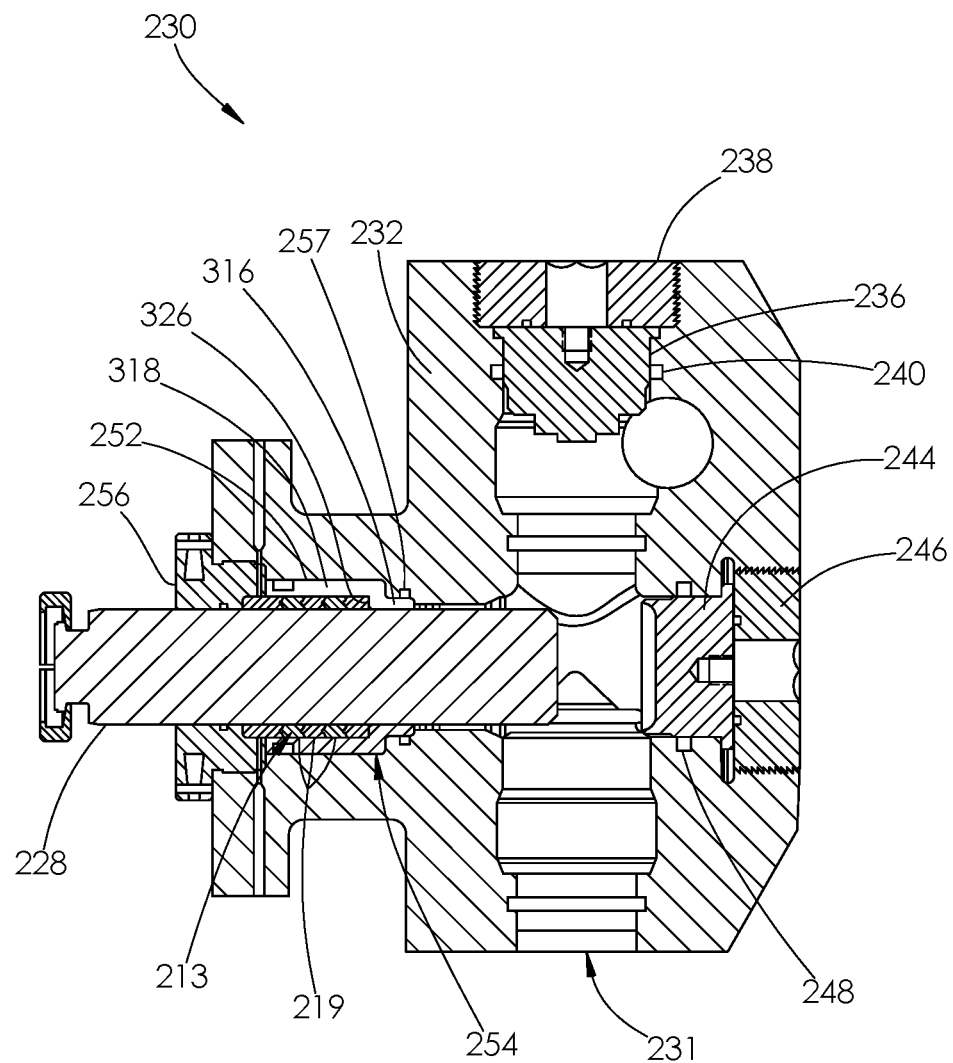
FIG. 9 is the cross-sectional view of FIG. 3 with the components shown installed within the fluid end. A plunger and a plurality of packing seals are also shown installed within the fluid end.

The discharge opening 235 is sealed closed by inserting a closure or discharge plug 236 into the discharge opening 235 and securing it in place by advancing a threaded retaining nut 238, as shown in FIG. 9. Unlike the conventional discharge plug 204 in FIG. 1, the discharge plug 236 does not have a seal mounted to it that seals against the walls surrounding the discharge bore 234. Instead, the discharge plug 236 defines a sealing surface 237 for a seal 242, shown in FIG. 4. The sealing surface 237 is axially spaced between a first surface 251 and an opposite second surface 253 of the plug 236. The seal 242 is mounted in an endless groove or recess 240 formed in the walls of the fluid end body 232 surrounding the discharge bore 234, as shown in FIGS. 3 and 4.

Figure 4:
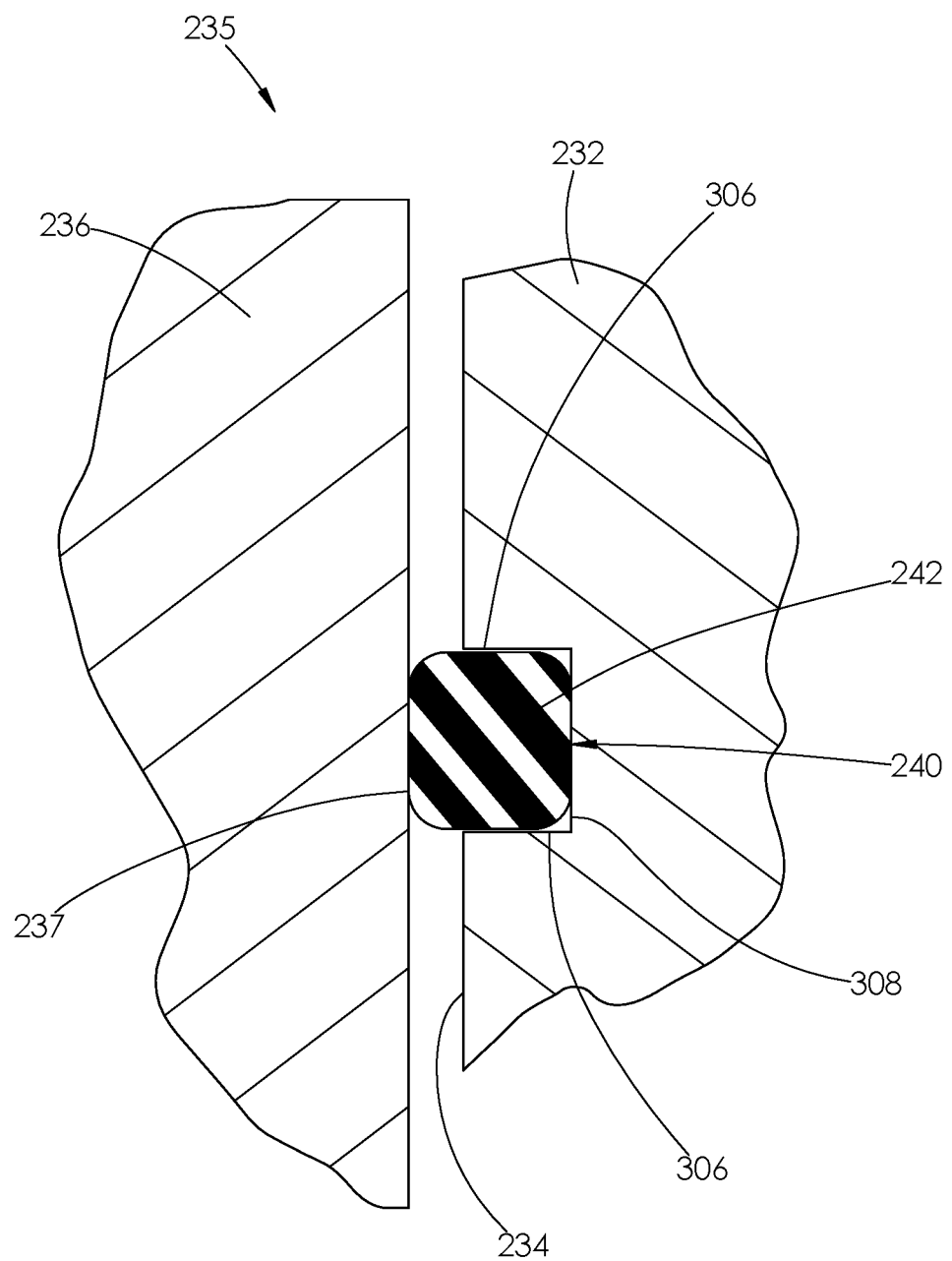
FIGS. 4 and 5 are enlarged depictions of portions of the fluid end of FIG. 3.

FIG. 4 is a simplified cross-sectional enlargement depicting the construction of the seal 242 positioned within the groove 240 formed in the fluid end body 232. The groove 240 opens into the discharge bore 234. The seal 242 in these illustrative embodiments is mounted in the groove 240 to include an outer radial surface, and is thereby supported by the fluid end body 232. The groove 240 is characterized by a pair of parallel sidewalls 306 joined by a base 308. The groove 240 opens towards a centerline of the conduit within which it is formed. Alternatively, as shown by groove 266 in FIGS. 6 and 7, the groove may open in a direction parallel to a centerline of the conduit within which it is formed. As above, the rectangular shape of the groove 240 is merely illustrative and not limiting of the contemplated embodiments. Any shape necessary to properly mount a desired seal is contemplated, whether the seal is elastomeric, spring, metal, and the like. The groove 240 intersects the discharge bore 234 permitting the seal 242 to be sized so that a portion of the seal 242 not contained in the groove 240 extends beyond the groove 240 and beyond the bore 234 to pressingly seal against the sealing surface 237 defined by the discharge plug 236, as shown in FIG. 4.

The seal construction depicted in FIG. 4 transfers the erosion wear from the fluid end body 232 to the discharge plug 236. Such transfer of erosion significantly improves fluid end operations because repairs involving the discharge plug 236 are significantly less complex and less expensive than repairs involving the fluid end body 232, which typically involve weld-repair. Furthermore, weld-repairing the fluid end body 232 makes it susceptible to premature fatigue cracking in the repaired area. Further, even more operating life can be achieved by applying an erosion-resistant surface treatment to the discharge plug 236, such as a high velocity oxygen fuel (HVOF) treatment, a tungsten carbide coating, material carburizing, and the like. Replacing instead of repairing an eroded discharge plug 236 is typically feasible, making it advantageously possible to repair a leaking valve constructed according to this technology in the field and thereby significantly reducing down time.

Returning to FIG. 3, another endless groove or recess 241 is formed in the fluid end body 232. The groove 241 intersects the discharge bore 234 and is configured to mount a seal (not depicted) that extends from the groove 241 to seal against a sealing surface formed by a discharge valve seat, like the valve seat 229 shown in FIG. 1. Similarly, another endless groove or recess 243 is formed in the fluid end body 232. The groove 243 intersects the intake bore 302 and is configured to mount a seal (not depicted) that extends from the groove 243 to seal against a sealing surface formed by a suction valve seat, like the valve seat 229 shown in FIG. 1. The grooves 241 and 243 may be shaped identically to the groove 240.

Continuing with FIG. 3, the fluid end body 232 includes a second conduit 310. The second conduit 310 includes a plunger bore 252 and a suction bore 247 positioned on opposite sides of the internal chamber 304. The suction bore 247 is sealed closed by inserting a closure or suction plug or cover 244 defining a sealing surface 245 and securing it in place by advancing a threaded retaining nut 246 within the body 232, as shown in FIG. 9. Like the discharge plug 236, the sealing surface 245 is axially spaced between a first surface 255 and an opposite second surface 261 of the suction plug 244. An endless groove or recess 248 is formed in the walls of the fluid end body 232 defining the suction bore 247. The groove 248 may be construed identically to the groove 240. The groove 248 is configured for mounting a seal, like the seal 242 shown in FIG. 4. The seal may extend from the groove 248 and seal against the sealing surface 245 of the suction plug 244. Such positioning transfers the wear from the fluid end body 232 to the suction plug 244 in comparison to previously attempted solutions and in accordance with the embodiments of this technology.

Continuing with FIG. 3, the plunger bore 252 defines a plunger opening 250. The plunger bore 252 is sized to closely receive a stuffing box sleeve 254 that is sealed in place by advancing a threaded retaining nut 256, as shown in FIG. 9. Because the sleeve 254 is secured within the fluid end body 232 by a retaining nut 256, no threads are formed in the sleeve 254 for mating with the fluid end body 232 or other component. Specifically, no threads are formed in an outer surface of the sleeve 254 along a length of the sleeve 254.

Figure 5:
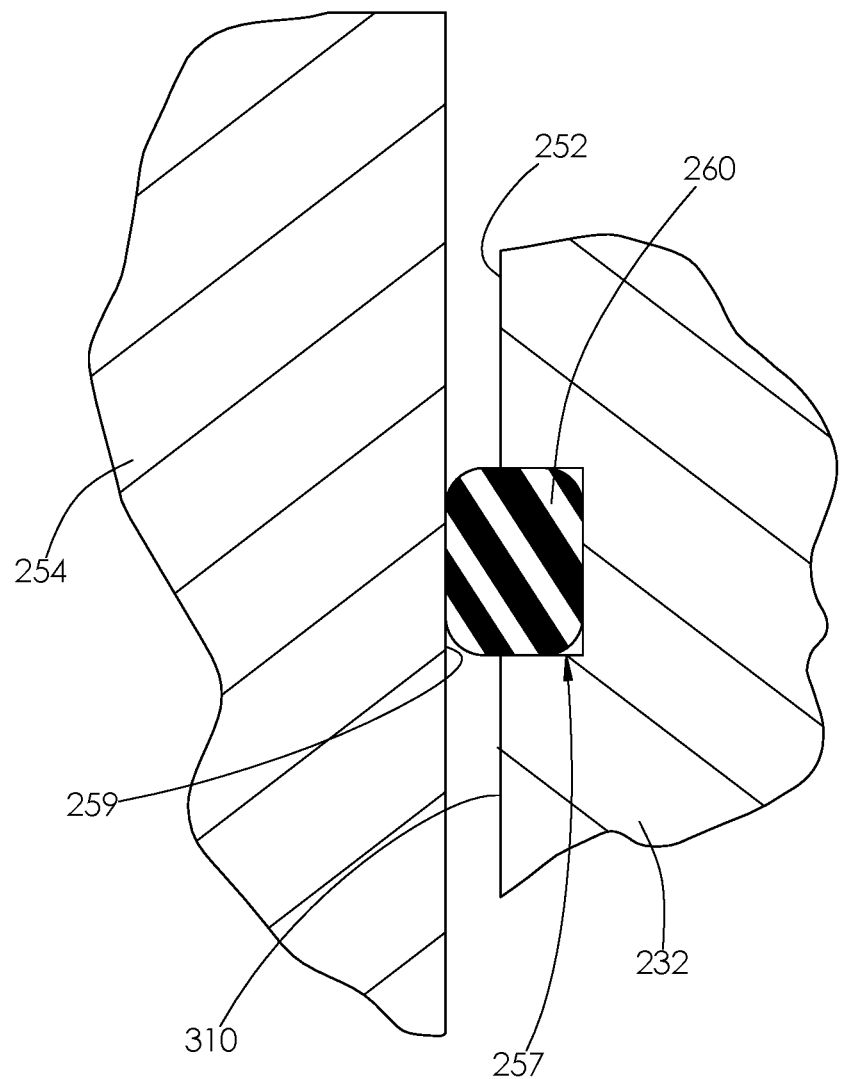

The plunger bore 252 includes a first segment 312 and a second segment 314. The first segment 312 is positioned closer to the internal chamber 304 and the suction bore 247 than the second segment 314. The second segment 314 has a greater diameter than the first segment 312. Threads may be formed in the walls of the fluid end body 232 surrounding at least a portion of the second segment 314. The threads may mate with threads formed on the retaining nut 256. An endless groove or recess 257 is formed in the walls of the fluid end body 232 surrounding the first segment 312. The groove 257 is configured to house a seal 260, as shown in FIG. 5. The groove 257 may be identical to the groove 240. Likewise, the seal 260 may be identical to the seal 242.

Continuing with FIG. 3, the stuffing box sleeve 254 is characterized by a tubular sleeve. The sleeve 254 comprises a first portion 316 joined to a second portion 318. The first and second portions 316 and 318 each have a cylindrical shape, such that the sleeve 254 may be considered primarily cylindrical. The first portion 316 has an outer diameter, D1. The second portion 318 has an outer diameter, D2. The diameter D2 is greater than the diameter D1. The diameter D2 is also greater than a maximum diameter of the groove 257. The sleeve 254 is installed within the plunger bore 252 such that the first portion 316 is closely received within the first segment 310 and the second portion 318 is closely received within the second segment 314, as shown in FIG. 9. The difference between the diameters D1 and D2 and the diameters of the plunger bore 252 prevent further movement of the sleeve 254 into the fluid end body 232, as shown in FIG. 9.

Continuing with FIGS. 3 and 9, the diameter D1 is constant along at least a portion of the length of the first portion 316 of the sleeve 254. The diameter D1 may be constant along the entire length of the first portion 316, with the exception of a tapered surface 319 between the first portion 316 and a first surface 322 of the sleeve 254. No grooves are formed in the outer surface of the first portion 316 for housing a seal. Rather, the outer surface of the first portion 316 has a sealing surface 259 for the seal 260, as shown in FIG. 5.

The diameter D2 is constant along at least a portion of the length of the second portion 318. The diameter D2 may be constant along the entire length of the second portion 318, with the exception of one or more grooves formed in the outer surface of the second portion 318 for housing a seal or receiving lubrication. The area of the outer surface of the sleeve 254 having the one or more grooves may be referred to as a third portion of the sleeve 254. An inner diameter of the third portion may be the same as the inner diameter of the second portion 318.

FIG. 5 is a simplified cross-sectional depiction of the body 232 having the groove 257. Again, the groove 257 intersects the plunger bore 252 permitting a portion including an outer radial surface of a radial seal 260 to be mounted in the groove 257. Another portion of the seal 260 not mounted in the groove 257 extends from the groove 257 to pressingly seal against the sealing surface 259 of the sleeve 254. Although in these depicted embodiments a radial seal is used, the contemplated embodiments are not so limited. The skilled artisan readily understands that other types of seals could be used instead of or in addition to the radial seal depicted, such as axial seals, crush seals, and the like.

Turning back to FIGS. 3 and 9, the first and second portions 316 and 318 of the sleeve 254 define a central passage 320. The central passage 320 interconnects a first and second outer surface 322 and 324 of the sleeve 254. The first outer surface 322 may be joined to the first portion 316 of the sleeve 254. The first outer surface 322 may be joined to the outer surface of the first portion 316 via the tapered surface 319. The second outer surface 324 may be joined the second portion 318 or the third portion of the sleeve 254. The retaining nut 256 may engage the second surface 324 of the sleeve 254, as shown in FIG. 9.

Continuing with FIG. 3, the first portion 316 has an inner diameter, D3. The second portion 318 has an inner diameter, D4. The diameter D4 is greater than the diameter D3. The diameter D3 may be constant along the length of the first portion 316, and the diameter D4 may be constant along the length of the second portion 318, and if included, the third portion. An inner surface of the second portion 318 may transition to an inner surface of the first portion 316 at a right angle, such that an internal seat 326 is formed within the second portion 318. The transition between the inner surface of the second portion 318 and the inner surface of the first portion 316 may be referred to as a first transition.

Similarly, an outer surface of the first portion 316 is joined to an outer surface of the second portion 318 at a right angle. In alternative embodiments, the first portion may be joined to the second portion by a tapered portion, as shown for example in FIG. 8. The transition between the outer surface of the first portion 316 and the outer surface of the second portion 318 may be referred to as a second transition. The first and second transitions may also be referred to as a fourth portion of the sleeve 254.

Continuing with FIG. 9, the plunger packing 213, including the plurality of packing seals 219, is installed within the second portion 318 of the sleeve 254 such that the plunger packing 213 abuts the internal seat 326. No portion of the plunger packing 213 is installed within the first portion 316 of the sleeve 254, as shown in FIG. 9. A portion of the plunger packing 213 may also be installed within the third portion of the sleeve 254. The plunger 228 is disposed within at least a portion of the sleeve 254 and the plunger packing 213.

Figure 6:
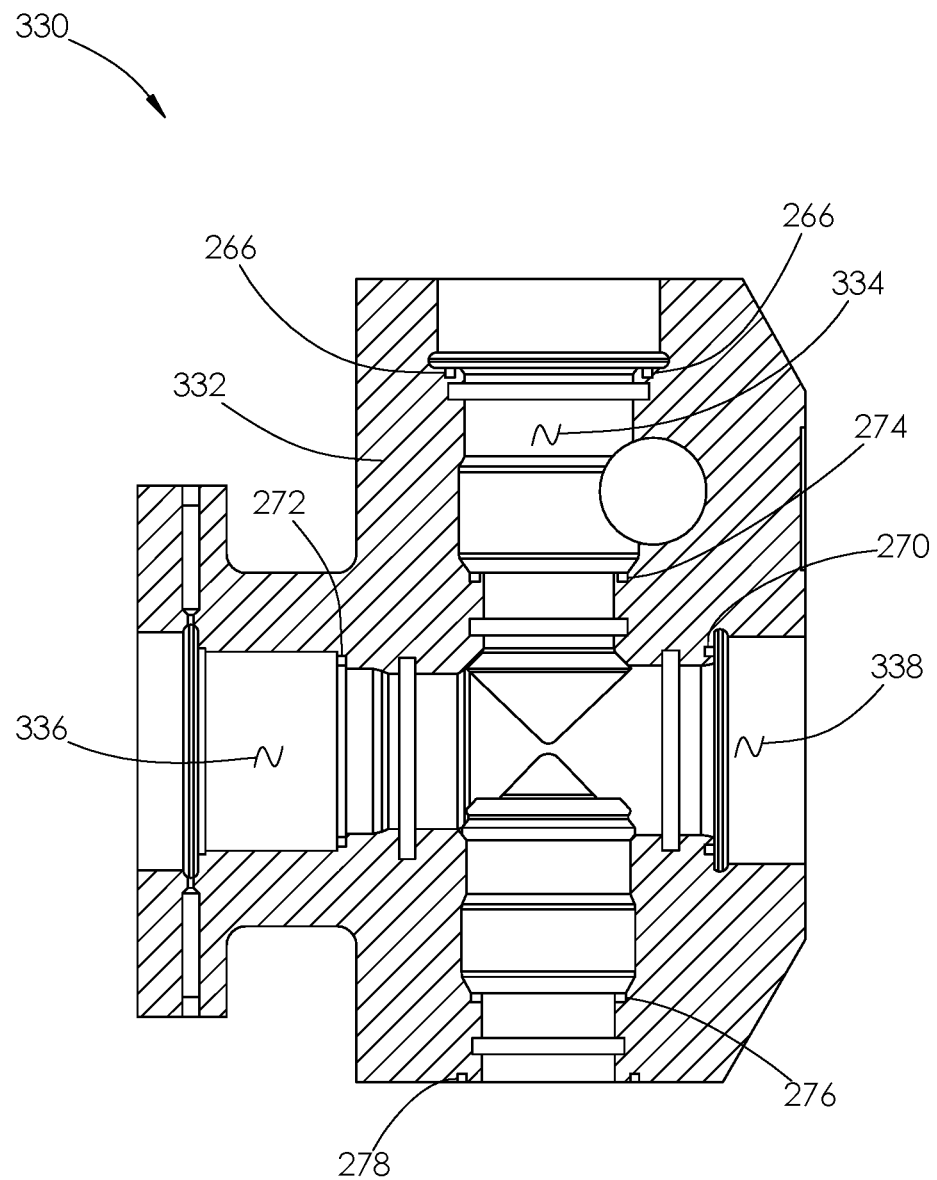
FIG. 6 is a cross-sectional depiction of another embodiment of a fluid end.
Figure 7:
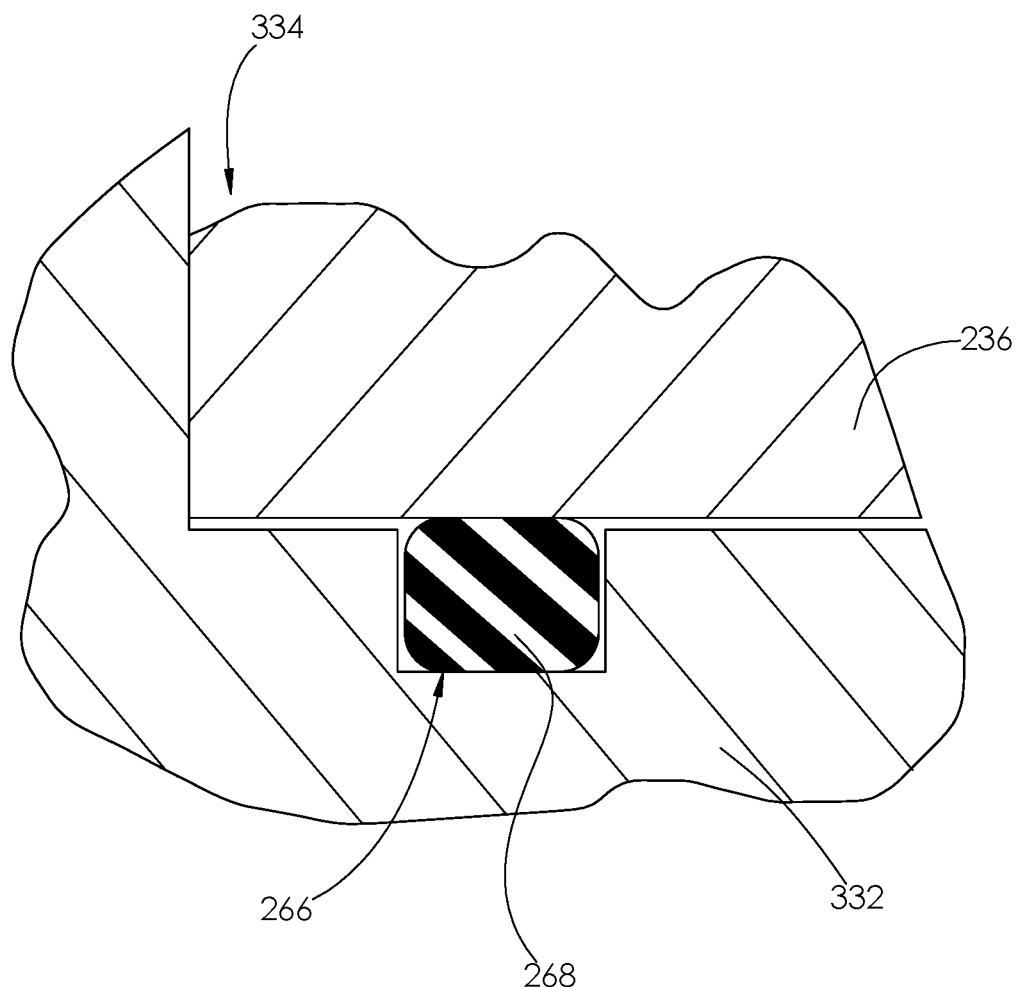
FIG. 7 is an enlarged depiction of a portion of the fluid end of FIG. 6.

FIG. 6 depicts another embodiment of a fluid end 330 comprising a fluid end body 332. A number of additional endless grooves or recesses are formed in the fluid end body 332 for mounting various seals to transfer the wear away from the body 332 to the mating component in accordance with embodiments of this technology. For example, a groove 266 is formed in the fluid end body 332 intersecting a discharge bore 334. Consistent with this whole description, the groove 266 permits mounting an axial seal 268, shown in FIG. 7. The seal 268 is configured to extend from the groove 266 to seal against a leading face of a discharge plug, like the discharge plug 236 shown in FIG. 3. FIG. 7 is a simplified enlarged depiction of the fluid end body 332 having the groove 266 into which the axial seal 268 is mounted. In these illustrative embodiments the seal 268 is configured to extend beyond the walls defining the discharge bore 334 to seal against a discharge plug 236 as it is urged downward by advancing a retaining nut, like the retaining nut 238, shown in FIG. 3.

Importantly, the simplified seal construction depicted in FIG. 7 and elsewhere is in no way limiting of the contemplated embodiments and scope of the claimed technology. In alternative embodiments a radial seal or a crush seal and the like can be employed to transfer the erosion wear from the fluid end body 232 or 332 to the mating component. A crush seal refers to a seal construction that acts at least to some degree both axially and radially. For example, a groove 272 having only two walls is shown in FIG. 6. The walls of the groove 272 extend concentrically around a plunger bore 336. A stuffing box sleeve may be formed to have side walls that fully overlies the groove 272 when it is positioned in the plunger bore 336, as shown for example in FIG. 15. This allows the seal to act as a crush seal because it seals axially and radially against the installed sleeve.

Returning to FIG. 6, the fluid end body 332 may have other surfaces forming endless grooves or recesses for mounting various other seals. For example, a groove 270 is formed in a suction bore 338 for mounting a seal that is configured to seal against a sealing surface of a suction plug, like the suction plug 244 shown in FIG. 3. In the same way the fluid end body 332 can have grooves 274 and 276 for mounting seals that are configured to seal against sealing surfaces of a discharge valve seat and a suction valve seat, respectively. Likewise, the fluid end body 332 can have a groove 278 for mounting a seal that is configured to seal against a suction manifold (not depicted). What's common in any event is the seal construction of this technology transfers the seal wear from the fluid end body 332 to the less complex and less expensive mating component that is attached to the fluid end body 332.

Figure 8:
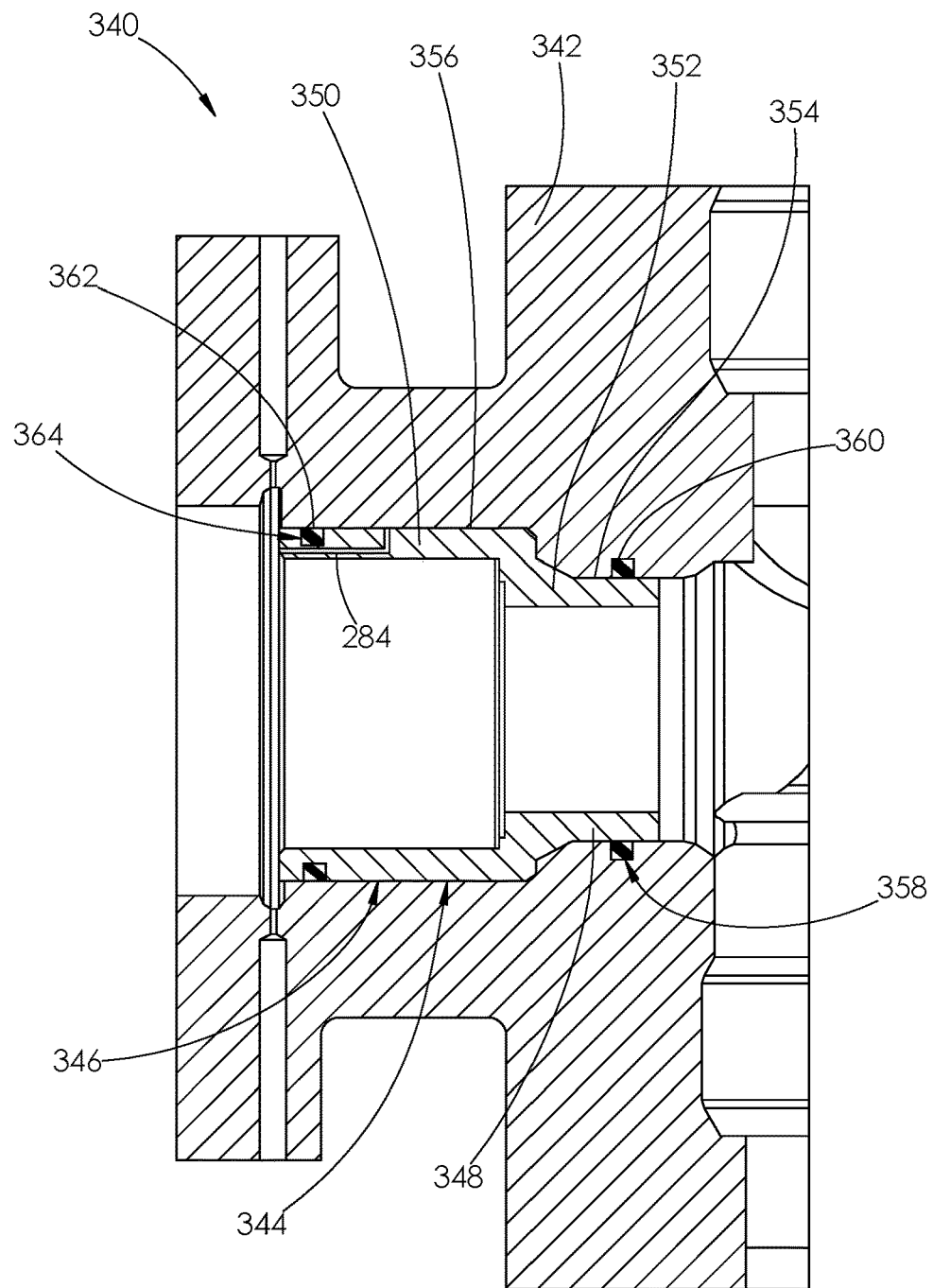
FIG. 8 is cross-sectional depiction of another embodiment of a fluid end. Another embodiment of a stuffing box sleeve is shown installed within the fluid end.

FIG. 8 depicts another embodiment of a fluid end 340 having a fluid end body 342. The fluid end 340 is generally identical to the fluid end 330, but includes another embodiment of a plunger bore 344. The plunger bore 344 is similar to the plunger bore 252, but is sized to receive another embodiment of a stuffing box sleeve 346. The stuffing box sleeve 346 is identical to the stuffing box sleeve 254 with a few exceptions.

The stuffing box sleeve 346 comprises a first portion 348 joined to a second portion 350 by a tapered portion 352. The first portion 348 is installed within a first segment 354 of the plunger bore 344 and the second portion 350 is installed within a second segment 356 of the plunger bore 344. A groove 358 is formed in the walls of the fluid end body 342 surrounding the first segment 354. The groove 358 may be identical to the groove 257. A seal 360 is shown installed within the groove 358 and engaging an outer sealing surface of the first portion 348. A seal 362 may also be installed within a groove 364 formed in an outer surface of the second portion 350 of the sleeve 346. Such area of the sleeve 346 may be referred to as a third portion of the sleeve 346.

As the stuffing box sleeve 346 is inserted into the plunger bore 344, air pressure forms in a space defined in the clearance gap between the outer diameter of the stuffing box sleeve 346 and the walls of the fluid end body 342 defining the plunger bore 344 and between the seal 360 and the seal 362 at the opposing end of the stuffing box sleeve 346. The air pressure exerts a force urging the stuffing box sleeve 346 out of the plunger bore 344, complicating manufacture and degrading the seal integrity at the lower end of the stuffing box sleeve 346. A breather opening 284 can be formed between that space and ambient space above the stuffing box sleeve 346 to vent the air pressure.

FIG. 8 also depicts a conventional construction of the seal 362 that is mounted in the groove 364 formed by the stuffing box sleeve 346 and extends from that groove 364 to seal against the walls of the fluid end body 342 defining the plunger bore 344. The contemplated embodiments can include combinations of the conventional construction and the construction of this technology where other matters come into play.

FIG. 8 also depicts employing the open-cylinder-shaped stuffing box sleeve 346 and securing it in place by advancing a retaining nut, like the retaining nut 256 shown in FIG. 3. That construction is illustrative and in no way limiting of the contemplated technology.

Other configurations can be employed as well. For example, the skilled artisan understands that a conventional stuffing box can be employed that combines a stuffing box sleeve and a retaining nut, unitarily, into one component. In other conventional constructions, a stuffing box may be used in combination with a seal carrier insert that mates with the stuffing box and provides the groove for mounting the seal. In yet other contemplated embodiments, a stuffing box sleeve can be modified to a construction combining a substantially cylindrical-shaped stuffing box to which is mated a seal surface insert that provides the sealing surface.

Returning momentarily to FIGS. 3 and 9, the sleeve 254 also protects the walls of the fluid end body 232 surrounding the plunger bore 252 from erosion by providing an inner surface against which the plunger packing 213 seals. That, again, by design transfers the wear from the fluid end body 232 to the less complex and less expensive sleeve 254.

With reference to FIGS. 10-14, another embodiment of a fluid end 400 is shown. The fluid end 400 comprises a fluid end body 402 releasably attached to a connect plate 404. The fluid end 400 is constructed similar to those embodiments described in United States Patent Publication No. 2019/0178243, in the name of Nowell et al., the entire contents of which are incorporated herein by reference. The fluid end body 402 and attached connect plate 404 may be referred to herein as the fluid end body or housing 406.

Figure 10:
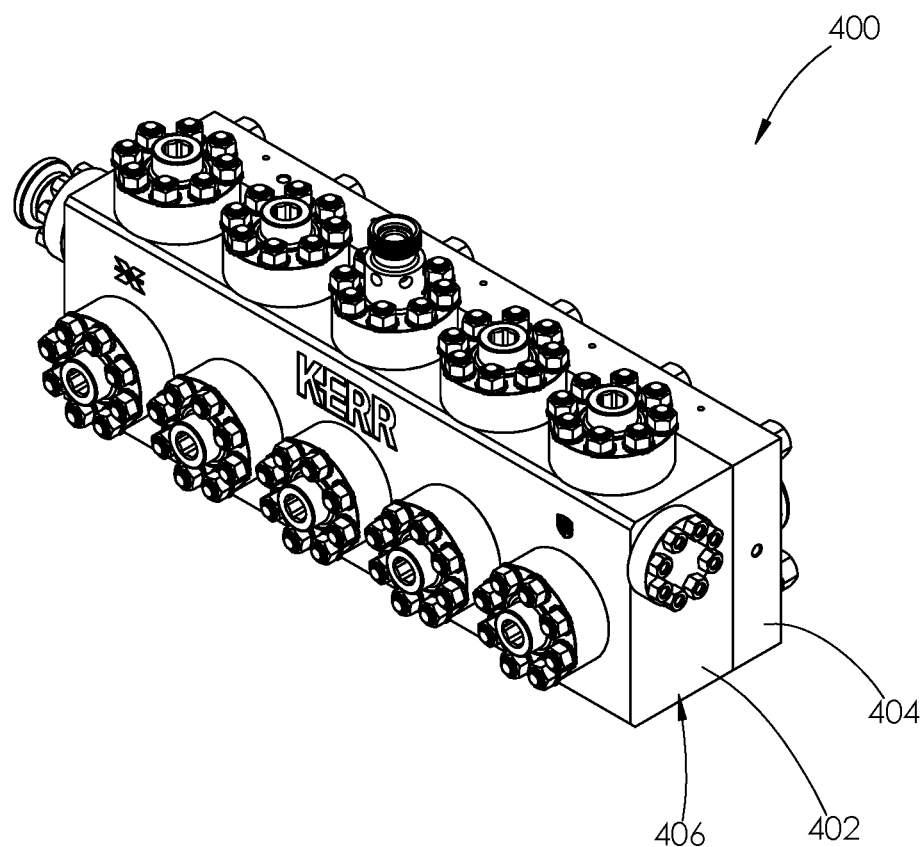
FIG. 10 is a front perspective view of another embodiment of a fluid end.
Figure 11:
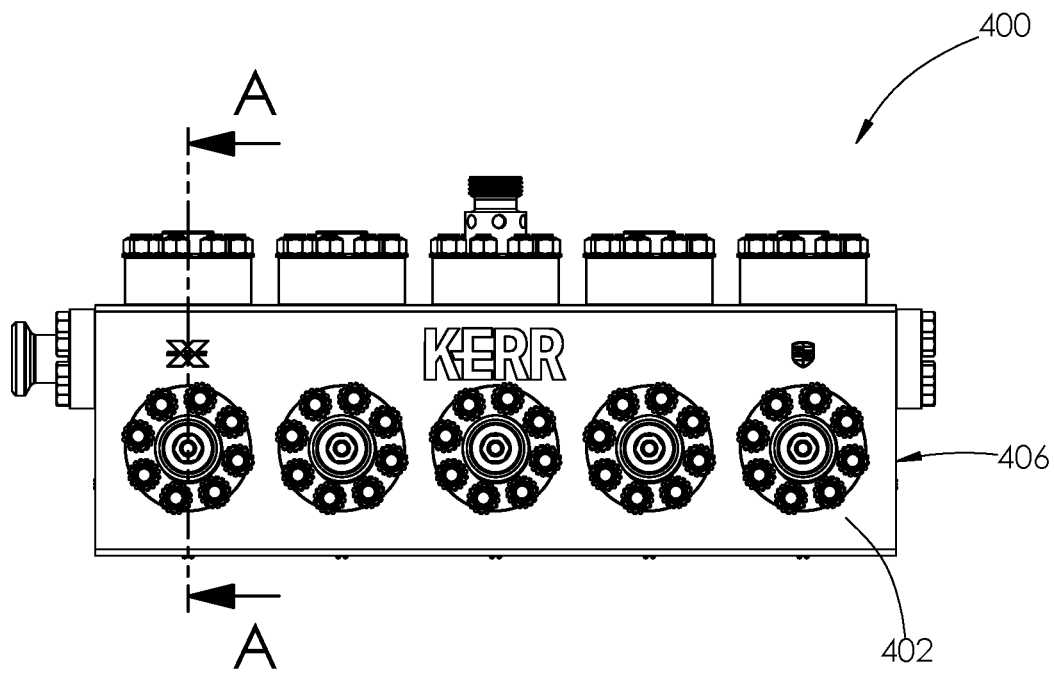
FIG. 11 is a front elevational view of the fluid end shown in FIG. 10.
Figure 12:
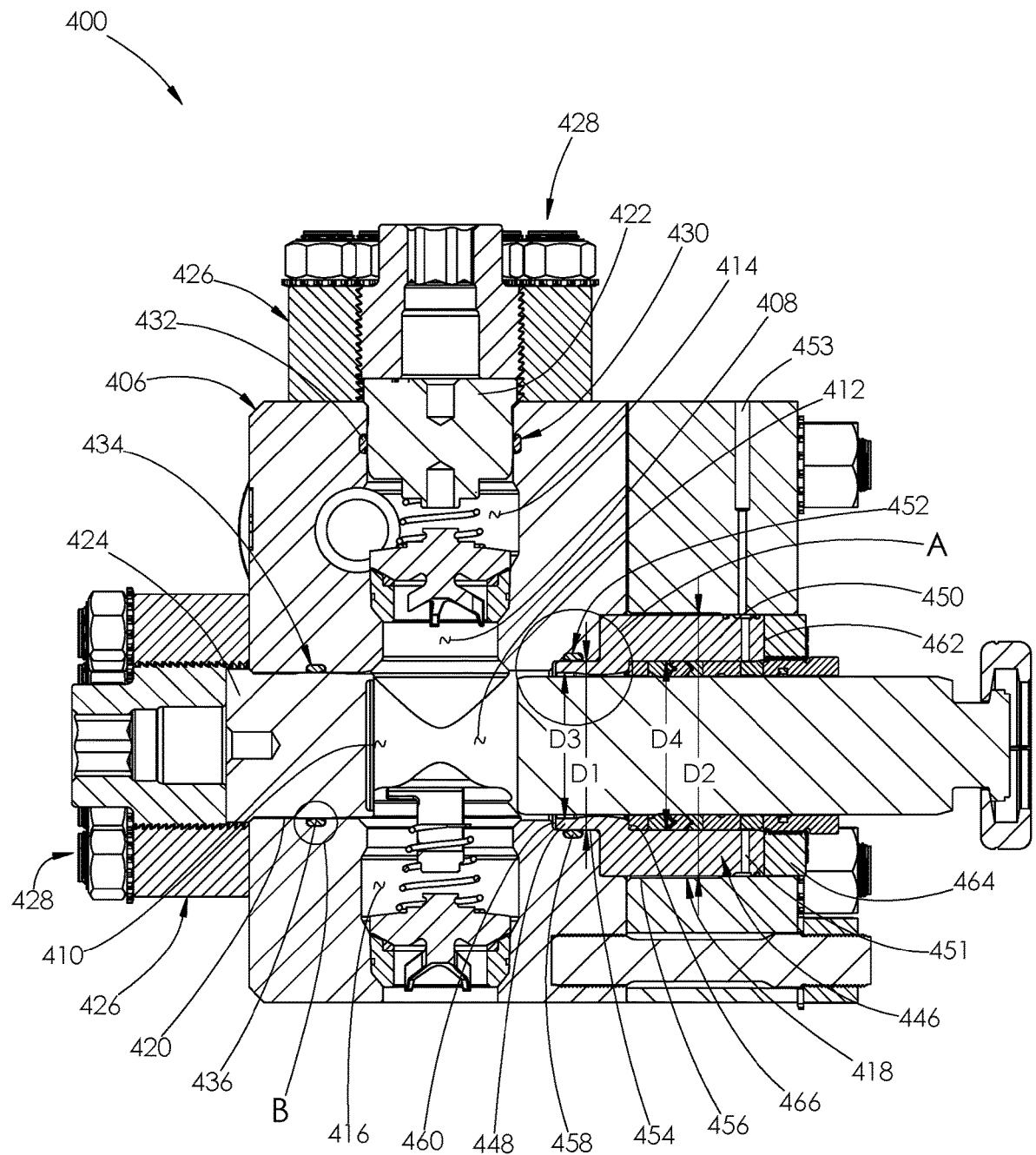
FIG. 12 is a cross-sectional view of the fluid end shown in FIG. 11, taken along line A-A.

With reference to FIG. 12, a first conduit 408 and a second conduit 410 are formed in the housing 406. The conduits 408 and 410 intersect to form an internal chamber 412. As shown in FIGS. 10 and 11, a plurality of the first and second conduits 408 and 410 are formed in the fluid end 400 and positioned in a side-by-side relationship. The first conduit 408 includes a discharge bore 414 and an intake bore 416 positioned on opposite sides of the internal chamber 412. The second conduit 410 includes a plunger bore 418 and a suction bore 420 positioned on opposite sides of the internal chamber 412.

Continuing with FIG. 12, a discharge plug 422 is installed within the discharge bore 414 and a suction plug 424 is installed within the suction bore 420. The plugs 422 and 424 are retained within the housing 406 using a plurality of retainers 426. Each retainer 426 is secured to the housing 406 using a fastening system 428, like that described in United States Patent Publication No. 2020/0300240, authored by Nowell et al., the entire contents of which are incorporated herein by reference.

Like the discharge and suction plugs 236 and 244 shown in FIG. 3, no grooves are formed in the outer surface of the plugs 422 and 424 for housing a seal. Instead, an endless groove 430 is formed in the walls of the housing 406 surrounding the discharge bore 414 for housing a seal 432. Likewise, an endless groove 434 is formed in the walls of the housing 406 surrounding the suction bore 420 for housing a seal 436. During operation, the seals 432 and 436 engage an outer sealing surface of the plugs 422 and 424. Over time, the seals 432 and 436 wear against the outer sealing surface of the plugs 422 and 424. If the outer surface of the plugs 422 and 424 begins to erode, the plugs 422 and 424 may be removed and replaced with a new plug.

Figure 14:
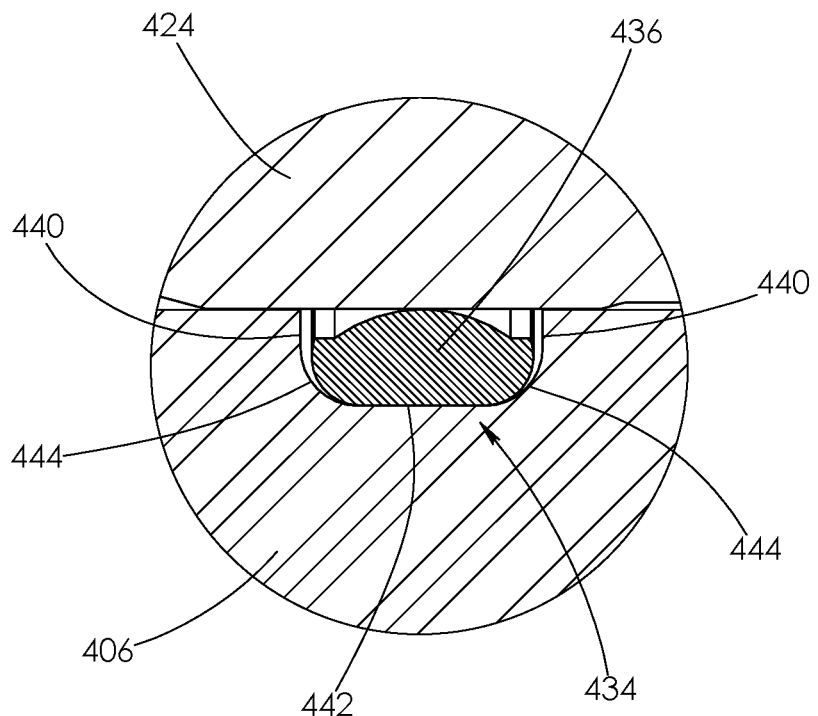
FIG. 14 is an enlarged view of area B from FIG. 12.

Turning to FIG. 14, the groove 434 is characterized by two side walls 440 joined by a base 442. The groove 240, shown in FIG. 4, has two side walls 306 joined to the base 308 at a right angle or with small radius corners. For example, the radius corners may be approximately 0.015 inches. In contrast, the groove 434, shown in FIG. 14, has side walls 440 joined to the base 442 via much larger radius corners 444. The radius is approximately 0.150 inches. The larger radius corners 444 make the groove 434 have a rounded cross-sectional shape. In operation, the larger radius corners 444 help relieve stress in the walls surrounding the groove 434, helping to increase the life of the fluid end 400. In alternative embodiments, the radius corners may be even larger in size, such that the groove has the shape of a half circle. In further alternative embodiments, the walls forming the groove may have multiple sections with different radii.

Continuing with FIG. 12, a stuffing box sleeve 446 is installed within the plunger bore 418. The stuffing box sleeve 446 is generally identical to the stuffing box sleeve 254, shown in FIG. 3, with a few exceptions. The sleeve 446 comprises a first portion 448 joined to a second portion 450. The first and second portions 448 and 450 each have a cylindrical shape, such that the sleeve 446 may be considered primarily cylindrical. The first portion 448 has an outer diameter, D1. The second portion 450 has an outer diameter, D2. The diameter D2 is greater than the diameter D1. The diameter D2 is also greater than a maximum diameter of a groove 452 formed in the walls surrounding the plunger bore 418. The sleeve 446 is installed within the plunger bore 418 such that the first portion 448 is installed within a first segment 454 of the plunger bore 418 and the second portion 450 is installed within a second segment 456 of the plunger bore 418. The difference between the diameters D1 and D2 and the diameters of the plunger bore 418 prevent further movement of the sleeve 446 into the housing 406.

Figure 13:
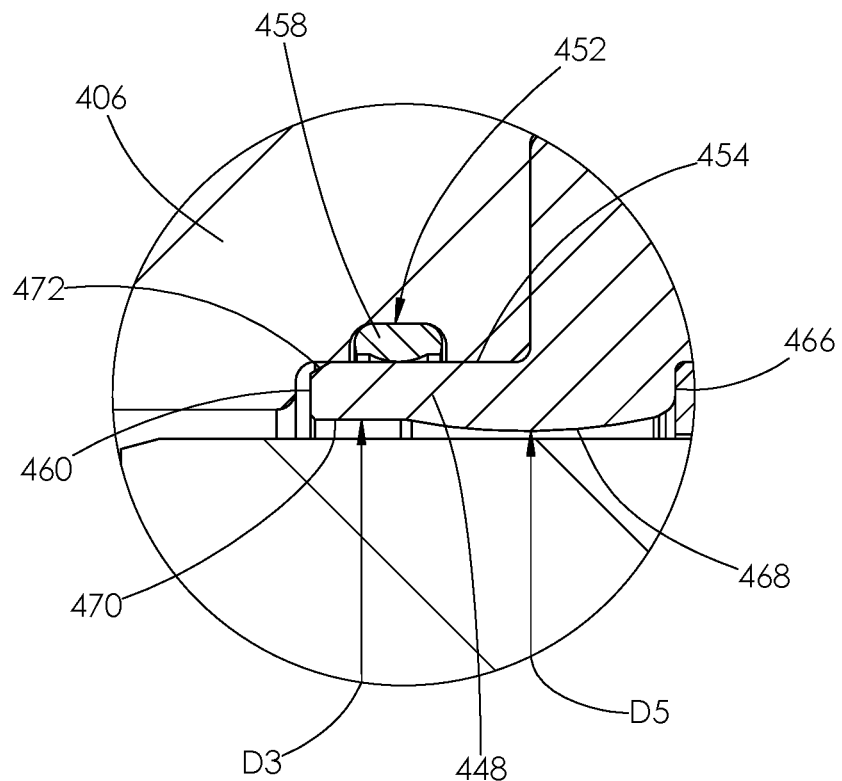
FIG. 13 an enlarged view of area A from FIG. 12.

Continuing with FIG. 12, the diameter D1 is constant along at least a portion of the length of the first portion 448 of the sleeve 446. The diameter D1 may be constant along the entire length of the first portion 448, with the exception of a tapered surface 472, shown in FIG. 13. No grooves are formed in the outer surface of the first portion 448 for housing a seal. Rather, the outer surface of the first portion 448 serves as a sealing surface for a seal 458, as shown in FIG. 13.

The diameter D2 is constant along at least a portion of the length of the second portion 450. The diameter D2 may be constant along the entire length of the second portion 450, with the exception of one or more grooves formed in the outer surface of the second portion 450 for housing a seal or for providing space for lubrication to be delivered to the interior of the housing 406. The outer surface of the sleeve 446 having the one or more grooves may be referred to as a third portion of the sleeve 446. An inner diameter of the third portion may be the same as the inner diameter of the second portion 450, with the exception of one or more lubrication holes.

The second portion 450 may further comprise one or more passages 451 interconnecting the inner and outer surfaces of the second portion 450, as shown in FIG. 12. The one or more passages 451 are in fluid communication with a lube port 453 formed in the housing 406. During operation, lubrication is delivered to the interior of the sleeve 446 via the lube port 453 and the one or more passages 451.

The first and second portions 448 and 450 of the sleeve 446 define a central passage. The central passage interconnects a first and second outer surface 460 and 462 of the sleeve 446. The first outer surface 460 may be joined to the first portion 448 of the sleeve 446. The first surface 460 may join the outer surface of the first portion 448 via the tapered surface 472, shown in FIG. 13. The second outer surface 462 may be joined the second portion 450 or the third portion of the sleeve 446. A retainer 464 may engage the second surface 462 of the sleeve 446 and secure the sleeve 446 within the plunger bore 418. The retainer 464 shown in FIG. 12 is secured to the housing 406 using a fastening system, like that shown in United States Patent Publication No. 2020/0300240, authored by Nowell et al. In alternative embodiments, the retainer 464 may thread into the walls of the housing 406.

Continuing with FIG. 12, the first portion 448 has an inner diameter, D3. The second portion 450 has an inner diameter, D4. The diameter D4 is greater than the diameter D3. An inner surface of the second portion 450 may transition to an inner surface of the first portion 448 at a right angle, such that an internal seat 466 is formed within the second portion 450. The transition between the inner surface of the second portion 450 and the inner surface of the first portion 448 may be referred to as a first transition.

Turning to FIG. 13, the inner surface of the first portion 448 may have a slightly convex portion 468 joined to a straight portion 470. The convex portion 468 may extend between the internal seat 466 and the straight portion 470. Because the first portion 448 includes the convex portion 468, the first portion 448 may also have an inner diameter, D5. The diameter D3 is greater than the diameter D5. The convex portion 468 helps increase the wall thickness of the first portion 448, which helps alleviate stress within the sleeve 446 during operation. In alternative embodiments, the inner surface of the first portion 448 may be shaped like the sleeve 254 shown in FIG. 3. The outer surface of the first portion 448 may also include the tapered surface 472 adjacent the first surface 460.

Continuing with FIG. 12, an outer surface of the first portion 448 is joined to an outer surface of the second portion 450 at a right angle. In alternative embodiments, the first portion may be joined to the second portion by a tapered portion, as shown for example in FIG. 8. The transition between the outer surface of the first portion 448 and the outer surface of the second portion 450 may be referred to as a second transition. The first and second transitions may also be referred to as a fourth portion of the sleeve 446.

Continuing with FIGS. 12 and 13, the groove 452 is formed in the walls surrounding the first segment 454 of the plunger bore 418. The groove 452 is identical to the groove 434. In alternative embodiments, the grooves 434 and 452 formed in the fluid end 400 may be shaped like any one of the other grooves described herein.

Figure 15:
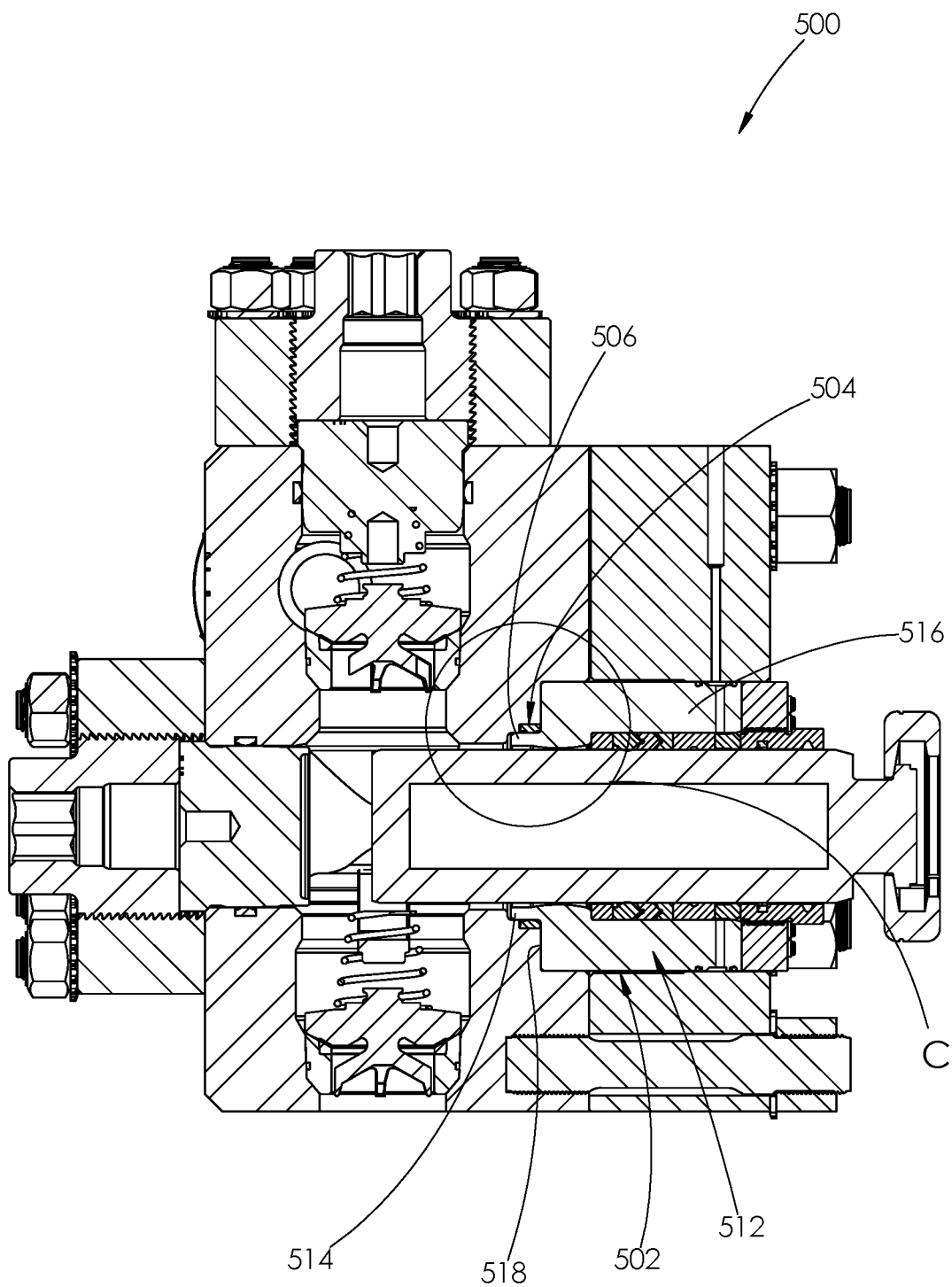
FIG. 15 is a cross-sectional view of another embodiment of a fluid end.
Figure 16:
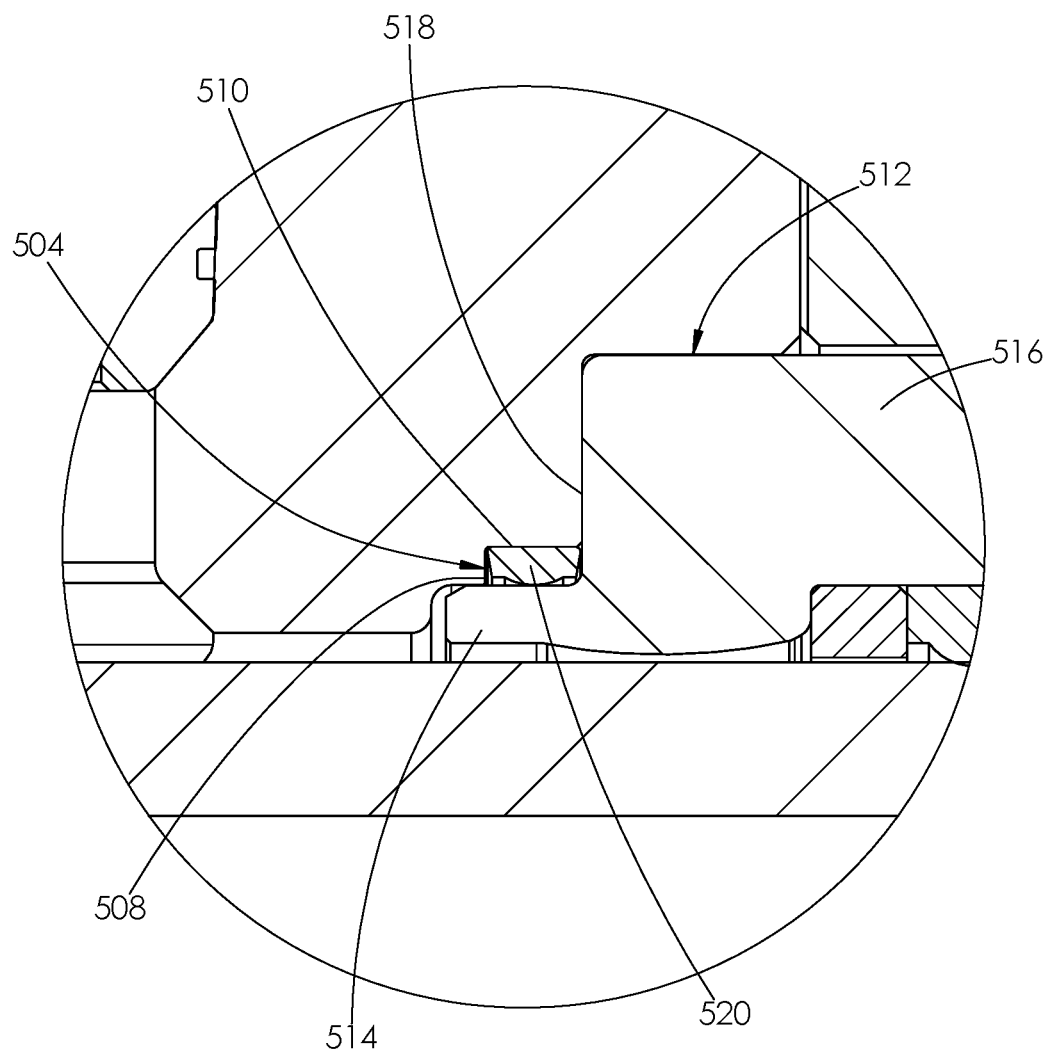
FIG. 16 is an enlarged view of area C from FIG. 15.
Figure 17:
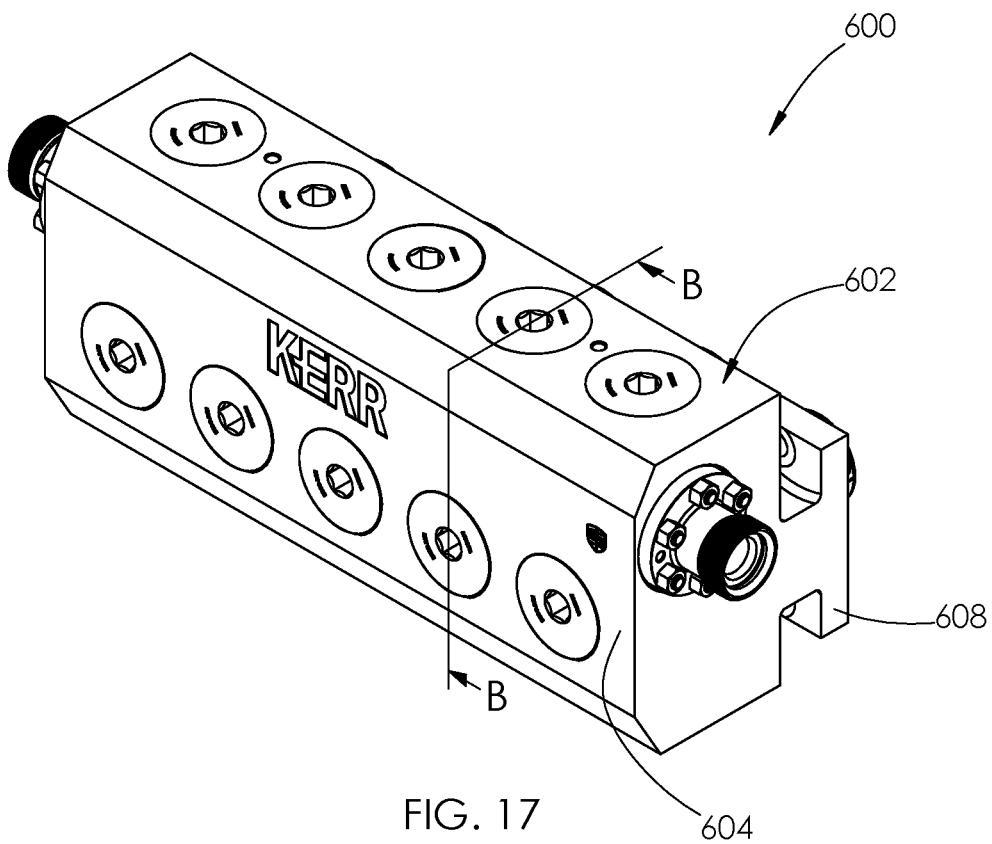
FIG. 17 is a front perspective view of another embodiment of a fluid end.
Figure 18:
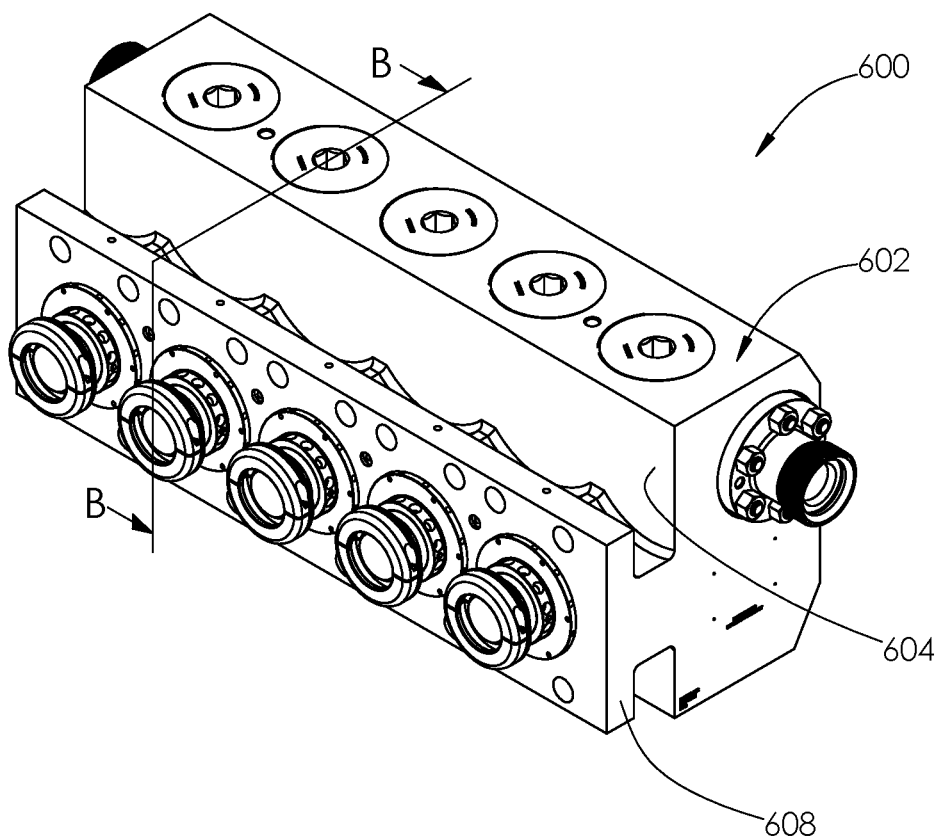
FIG. 18 is a rear perspective view of the fluid end shown in FIG. 17.

Turning to FIGS. 15 and 16, another embodiment of a fluid end 500 is shown. The fluid end 500 is identical to the fluid end 400, with the exception of its plunger bore 502. A groove 504 formed in the walls surrounding a first segment 506 of the plunger bore 502 only has two side walls 508 and 510, as shown in FIG. 16. The side walls 508 and 510 may intersect at a right angle or a radius corner.

Another embodiment of a stuffing box sleeve 512 is shown installed within the plunger bore 502. The sleeve 512 is identical to the sleeve 446, but may have a shorter first portion 514 and a longer second portion 516. When the sleeve 512 is installed within the plunger bore 502, a base 518 of the second portion 516 forms a third wall of the groove 504. A seal 520 installed within the groove 504 may be identical to the seal 454, shown in FIG. 13. During operation, the seal 520 wears against an outer sealing surface of the first portion 514 of the sleeve 512.

Figure 19:
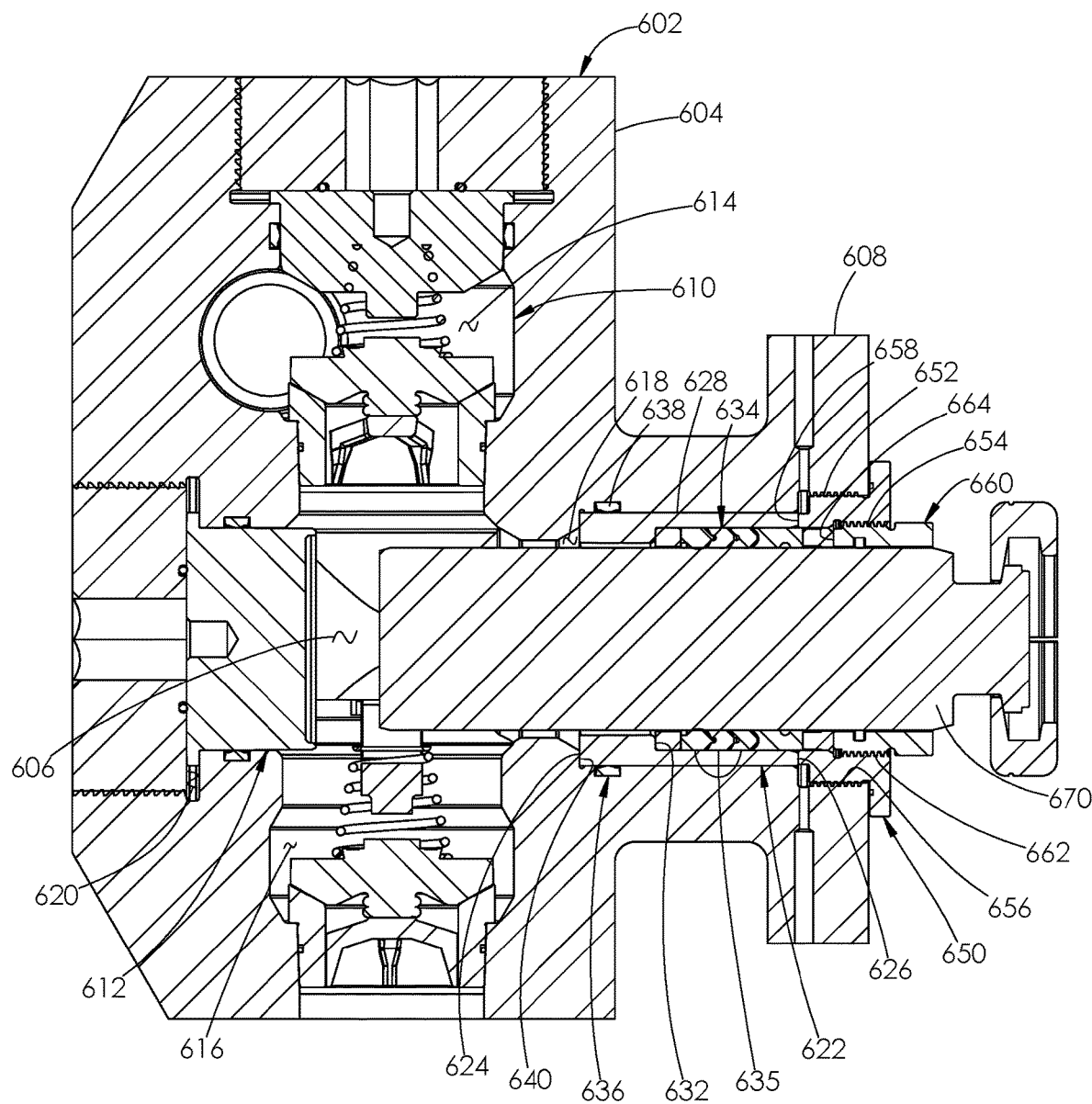
FIG. 19 is a cross-sectional view of the fluid end shown in FIGS. 17 and 18, taken along line B-B.
Figure 20:
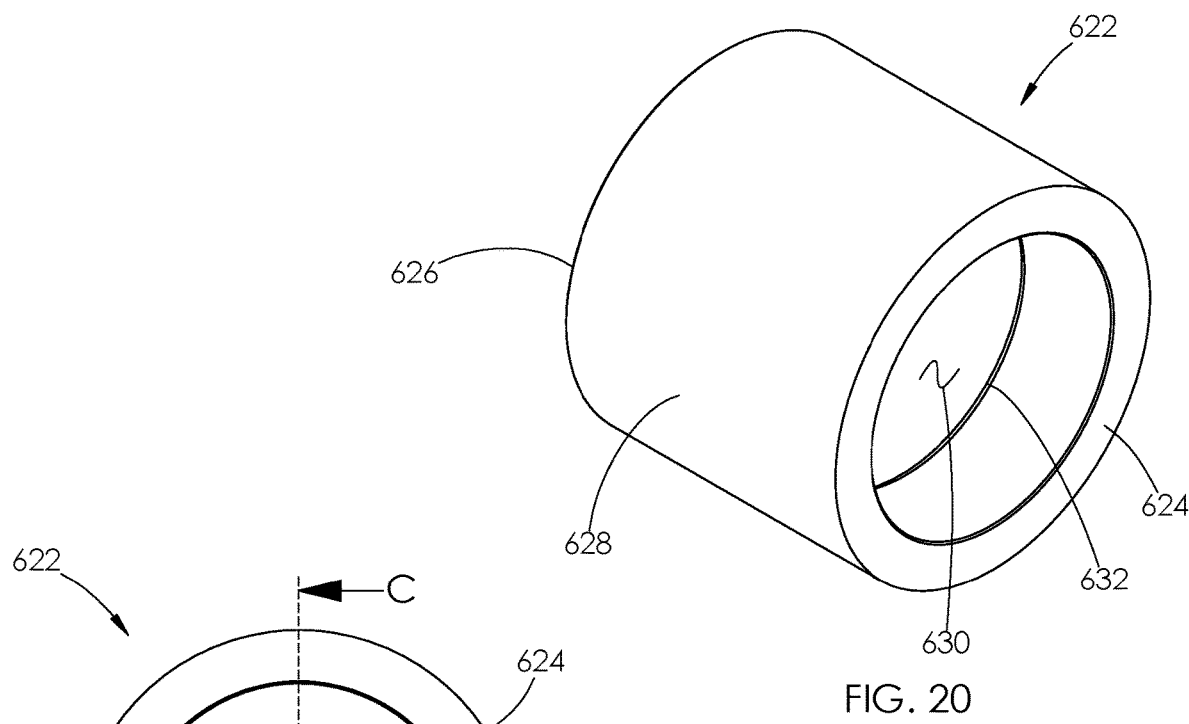
FIG. 20 is a front perspective view of another embodiment of a sleeve. The sleeve is shown installed within the fluid end shown in FIG. 19.
Figure 21:
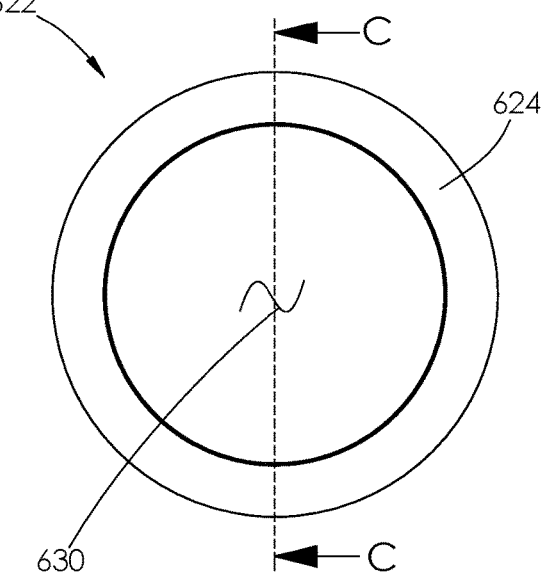
FIG. 21 is front elevational view of the sleeve shown in FIG. 20.
Figure 22:
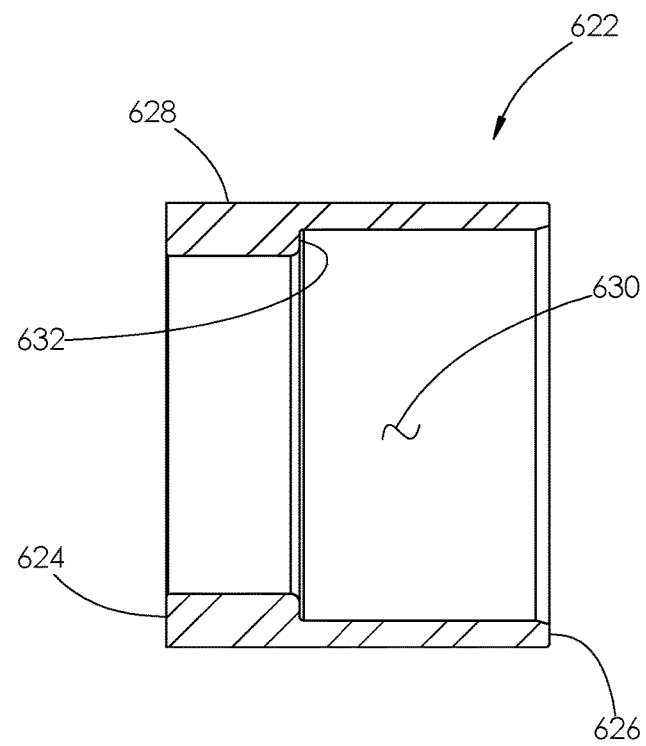
FIG. 22 is a cross-sectional view of the sleeve shown in FIG. 21, taken along line C-C.

Turning to FIGS. 17-22, another embodiment of a fluid end 600 is shown. The fluid end 600 comprises a housing 602 having an external surface 604 and internal chamber 606, as shown in FIG. 19. The housing 602 is shaped similar to that shown in FIG. 1, in that it is of single-piece construction and includes a flanged portion 608. The flanged portion 608 is configured to receive a plurality of stay rods used to attach the fluid end 600 to a power end. First and second intersecting conduits 610 and 612 are formed in the housing 602. The first conduit 610 has first and second sections 614 and 616, each of which independently interconnects the internal chamber 606 and the external surface 604 of the housing 602. The second conduit 612 has third and fourth sections 618 and 620, each of which independently interconnects the internal chamber 606 and the external surface 604.

Continuing with FIGS. 19-22, the fluid end 600 uses another embodiment of a sleeve 622. The sleeve 622 is of single-piece construction and comprises opposed first and second surfaces 624 and 626 joined by an outer intermediate surface 628. In contrast to the other sleeve embodiments disclosed herein, the outer intermediate surface 628 of the sleeve 622 has a constant outer diameter along the entire length of the sleeve 622.

The sleeve 622 defines a central passage 630 and has an internal shoulder 632 formed therein. The internal shoulder 632 is positioned closer to the first surface 624 than the second surface 626 of the sleeve 622. A plunger packing 634 is installed within the sleeve 622 through the second surface 626 until it abuts the internal shoulder 632. The plunger packing 634 comprises a plurality of packing seals 635.

Similar to the other sleeve embodiments disclosed herein, no grooves are formed in the outer intermediate surface 628 of the sleeve 622 for housing a seal. Likewise, no threads are formed in the outer intermediate surface 628 for engaging the housing 602 or another component. The sleeve 622 may be made of steel, and not be coated with any abrasive material. If the sleeve 622 begins to erode over time, the sleeve 622 may be removed and replaced with a new sleeve.

Continuing with FIG. 19, an endless groove 636 is formed within the walls of the housing 602 surrounding the third section 618. The groove 636 is positioned closer to the internal chamber 606 than the external surface 604 of the housing 602 and may be shaped like any of the endless grooves disclosed herein. An annular seal 638 is installed within the groove 636. When the sleeve 622 is installed within the third section 618, the seal 638 engages the outer intermediate surface 628 of the sleeve 622. Over time, the seal 638 wears against the intermediate surface 628 of the sleeve 622. If the sleeve 622 begins to erode, it can be removed and replaced with a new sleeve.

The housing 602 further comprises an internal shoulder 640 formed within the third section 618 between the groove 636 and the internal chamber 606. Axial movement of the sleeve 622 within the third section 618 is prevented by engagement of the first surface 624 of the sleeve 622 with the internal shoulder 640. When installed within the third section 618, no portion of the sleeve 622 projects from the external surface 604 of the housing 602.

The sleeve 622 is held within the third section 618 by a retainer 650. The retainer 650 has a threaded outer surface 652 and defines a threaded central opening 654. The threaded outer surface 652 mates with internal threads 656 formed in the walls of the housing 602. When the retainer 650 is installed within the housing 602 a first surface 658 of the retainer 650 abuts the second surface 626 of the sleeve 622, but the retainer 650 does not engage the plunger packing 634.

Continuing with FIG. 19, a packing nut 660 having a threaded outer surface 662 is installed within the retainer 650. The threaded outer surface 662 of the packing nut 660 mates with the threaded central opening 654 of the retainer 650. The packing nut 660 is turned within the retainer 650 until a first surface 664 of the packing nut 66o engages and compresses the plunger packing 634. A reciprocating plunger 670 is disposed within the packing nut 660, retainer 650, plunger packing 634, and the sleeve 622.

In alternative embodiments, the housing 602 may be configured to use one of the other embodiments of retainers disclosed herein. The other components installed within the housing 602 and shown in FIG. 19 are similar to those disclosed herein.

In alternative embodiments, the sleeve may have different shapes and sizes but still function to form a second sidewall of the groove. In further alternative embodiments, the suction and discharge plugs may be configured to form one of the sidewalls of a two-walled groove formed in the housing.

Summarizing, this technology contemplates a high pressure fluid flow apparatus constructed of a body defining a flow passage, a closure mounted to the body, and a means for sealing between the body and the closure. For purposes of this description and meaning of the claims the term "closure" means a component that is attached or otherwise joined to the body to provide a high-pressure fluid seal between the body and the closure. In some embodiments such as the described fluid end embodiments "closure" encompasses nonmoving components joined to the body to seal an opening such as but not limited to the discharge plug, suction plug, discharge valve seat, suction valve seat, stuffing box sleeve, discharge flange, suction manifold, and the like. The term "means for sealing" means the described structures and structural equivalents thereof that mount a seal to a body instead of a mating closure to transfer the wear in comparison to previously attempted solutions from the body to the closure. "Means for sealing" expressly does not encompass previously attempted solutions that mount a seal to the closure to extend therefrom and seal against the body.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end assembly, comprising:
   a housing having an external surface and internal chamber;
   a first conduit formed in the housing and having first and second sections, each section independently interconnecting the internal chamber and the external surface;
   a second conduit formed in the housing, intersecting the first conduit and having third and fourth sections, each section independently interconnecting the internal chamber and the external surface;
   a corner section formed in a wall or walls defining the third section and extending concentrically around the third section;
   a tubular sleeve installed within the third section, the sleeve of single-piece construction and comprising a first portion joined to a second portion, the second portion having a greater outer diameter than the first portion; and in which the sleeve has a first surface joined to the first portion and a second surface joined to the second portion, the first and second surfaces joined by an outer intermediate surface that extends along a length of the sleeve;
   in which the length of the sleeve is bounded by the first and second surfaces;
   in which no threads are formed in the outer intermediate surface of the sleeve; and
   in which no grooves for housing a seal are formed in the outer intermediate surface of the first portion;
   an annular seal positioned within the corner section and engaged with the outer intermediate surface of the first portion;
   a plurality of packing seals installed within the second portion and abutting an internal shoulder formed within the second portion;
   a retainer engaging the second surface of the sleeve and defining a threaded central opening; and
   a packing nut installed within the threaded central opening of the retainer and engaging the plurality of packing seals.

2. The fluid end assembly of claim 1, further comprising:
   a reciprocating plunger installed within the sleeve and the plurality of packing seals.

3. The fluid end assembly of claim 1, in which the corner section is characterized by two and only two walls.

4. The fluid end assembly of claim 1, in which the retainer is attached to the housing using a fastening system, the fastening system comprising a plurality of threaded studs.

5. The fluid end assembly of claim 1, in which the retainer has a threaded outer surface.

6. The fluid end assembly of claim 1, in which the sleeve further comprises a passage formed in the second portion and interconnecting an internal surface and the outer intermediate surface of the second portion.

7. The fluid end of claim 6, in which the passage is in fluid communication with a lube port formed in the housing, the lube port interconnecting the third section and the external surface of the housing.

8. The fluid end assembly of claim 1, in which the first portion is joined to the second portion at a right angle.

9. The fluid end assembly of claim 1, in which no portion of the sleeve projects from the external surface of the housing.

* * * * *